(12) United States Patent
Shibuya et al.

(10) Patent No.: US 7,864,372 B2
(45) Date of Patent: Jan. 4, 2011

(54) COLOR CONVERSION APPARATUS AND COLOR CONVERSION METHOD

(75) Inventors: Takeshi Shibuya, Ibaraki (JP); Teruyoshi Yamamoto, Kanagawa (JP); Nobuyuki Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 402 days.

(21) Appl. No.: 12/127,071

(22) Filed: May 27, 2008

(65) Prior Publication Data

US 2008/0291478 A1 Nov. 27, 2008

(30) Foreign Application Priority Data

May 25, 2007 (JP) .............................. 2007-139685

(51) Int. Cl.
 *H04N 1/60* (2006.01)
 *H04N 1/46* (2006.01)
 *G03F 3/08* (2006.01)
 *G06K 9/00* (2006.01)

(52) U.S. Cl. .................. 358/1.9; 358/525; 358/3.23; 358/518; 358/523; 382/162; 382/167; 382/30

(58) Field of Classification Search .................. 358/1.9, 358/525, 3.23, 518, 523; 382/162, 167, 300
See application file for complete search history.

(56) References Cited

U.S. PATENT DOCUMENTS

| 4,334,240 | A | 6/1982 | Franklin |
| 6,421,140 | B1 * | 7/2002 | Hui ............................. 358/1.9 |
| 6,771,275 | B1 * | 8/2004 | Cook et al. ................. 345/604 |
| 7,265,870 | B2 * | 9/2007 | Velde et al. .................. 358/1.9 |

FOREIGN PATENT DOCUMENTS

| GB | 1 595 122 | 8/1981 |
| JP | 56-14237 | 2/1981 |
| JP | 58-16180 | 3/1983 |
| JP | 02-226867 | 9/1990 |
| JP | 03-229573 | 10/1991 |
| JP | 07-099587 | 4/1995 |
| JP | 09-261499 | 10/1997 |

* cited by examiner

*Primary Examiner*—Charlotte M Baker
(74) *Attorney, Agent, or Firm*—Ladas & Parry LLP

(57) ABSTRACT

A color conversion method including the steps of a) generating output values corresponding to a body-center of each cubic lattice block included in a three-dimensional input space, and interpolating between the output values generated in step a) and the LUT values. The cubic lattice block is divided into six quadrangular pyramids. Each of the quadrangular pyramids is divided into two tetrahedron blocks by a side parallel to a predetermined straight line and by a plane including a diagonal line of a bottom plane that intersects the side parallel to the predetermined axis. Corrected output values are determined by performing linear interpolation on output values corresponding to body-center points of each of the tetrahedron blocks and using LUT values corresponding to three lattice points of each of the tetrahedron blocks and three correction coefficients based on a positional relationship of input color signals inside each of the tetrahedron blocks.

6 Claims, 22 Drawing Sheets

FIG.3

| rel | | | relationship | max (S_L) | min (S_s) | max+min<dg (S_p) | P_s | P_m | P_L |
|---|---|---|---|---|---|---|---|---|---|
| $r_L>g_L$ | $r_L>b_L$ | $g_L>b_L$ | | | | | (34) | (33) | (32) |
| 1 | 1 | 1 | $r_L>g_L>b_L$ | $r_L$ (100) | $b_L$ (001) | 1 | P[000] | P[100] | P[110] |
| 1 | 1 | 0 | $r_L>b_L \geq g_L$ | $r_L$ (100) | $g_L$ (010) | 0 | P[111] | P[110] | P[100] |
| 1 | 0 | 1 | — | — | — | — | — | — | — |
| 1 | 0 | 0 | $b_L \geq r_L>g_L$ | $b_L$ (001) | $g_L$ (010) | 1 | P[000] | P[100] | P[101] |
| 0 | 1 | 1 | $g_L \geq r_L>b_L$ | $g_L$ (010) | $b_L$ (001) | 0 | P[111] | P[101] | P[100] |
| 0 | 1 | 0 | — | — | — | — | — | — | — |
| 0 | 0 | 1 | $g_L>b_L \geq r_L$ | $g_L$ (010) | $r_L$ (100) | 1 | P[000] | P[010] | P[110] |
| 0 | 0 | 0 | $b_L \geq g_L \geq r_L$ | $b_L$ (001) | $r_L$ (100) | 0 | P[111] | P[011] | P[001] |

FIG.10

| $A_L$ ([14:0]) | | | OUTPUT CHANNEL | | |
|---|---|---|---|---|---|
| i [14:10] | j [9:5] | k [4:0] | R | G | B |
| 0 | 0 | 0 | R[0,0,0] | G[0,0,0] | B[0,0,0] |
| 0 | 0 | 1 | R[0,0,1] | G[0,0,1] | B[0,0,1] |
| 0 | 0 | 2 | R[0,0,2] | G[0,0,2] | B[0,0,2] |
| 0 | 0 | 3 | R[0,0,3] | G[0,0,3] | B[0,0,3] |
| 0 | 0 | 4 | R[0,0,4] | G[0,0,4] | B[0,0,4] |
| ... | | | ... | ... | ... |
| 0 | 0 | 14 | R[0,0,14] | G[0,0,14] | B[0,0,14] |
| 0 | 0 | 15 | R[0,0,15] | G[0,0,15] | B[0,0,15] |
| 0 | 0 | 16 | R[0,0,16] | G[0,0,16] | B[0,0,16] |
| 0 | 1 | 0 | R[0,1,0] | G[0,1,0] | B[0,1,0] |
| 0 | 1 | 1 | R[0,1,1] | G[0,1,1] | B[0,1,1] |
| 0 | 1 | 2 | R[0,1,2] | G[0,1,2] | B[0,1,2] |
| ... | | | ... | ... | ... |
| 0 | 1 | 15 | R[0,1,15] | G[0,1,15] | B[0,1,15] |
| 0 | 1 | 16 | R[0,1,16] | G[0,1,16] | B[0,1,16] |
| 0 | 2 | 0 | R[0,2,0] | G[0,2,0] | B[0,2,0] |
| 0 | 2 | 1 | R[0,2,1] | G[0,2,1] | B[0,2,1] |
| 0 | 2 | 2 | R[0,2,2] | G[0,2,2] | B[0,2,2] |
| ... | | | ... | ... | ... |
| ... | | | ... | ... | ... |
| 16 | 16 | 14 | R[16,16,14] | G[16,16,14] | B[16,16,114] |
| 16 | 16 | 15 | R[16,16,15] | G[16,16,15] | B[16,16,15] |
| 16 | 16 | 16 | R[16,16,16] | G[16,16,16] | B[16,16,16] |

COLOR CONVERSION APPARATUS AND COLOR CONVERSION METHOD

BACKGROUND OF THE INVENTION

1. Field of the Invention

The present invention relates to a color conversion apparatus and a color conversion method, and more particularly to a color conversion apparatus and a color conversion method for precisely correcting differences of reproduced colors caused by characteristic differences among different devices.

2. Description of the Related Art

In conventional color printers, color printing presses, or pre-processing apparatuses thereof (e.g., personal computers) which significantly exhibit nonlinear color reproduction characteristics with respect to color material characteristics or color mixture, it is difficult to perform sufficient correction by using a simple linear transformation method. Therefore, color correction is performed by, for example, conducting linearization for each channel and performing interpolation with use of a multidimensional lookup table (hereinafter referred to as "LUT").

Typically, the input channels of the multidimensional LUT may be, for example, three channels comprising red (R), green (G), and blue (B), three channels comprising chromaticity coordinates of X, Y, and Z defined by CIE (Commission Internationale d'Eclairage), or three channels comprising lightness (L*), chromaticity (a*), and chromaticity (b*). Comparable output channels of the multidimensional LUT may be, for example, three channels of R, G, and B, four channels of cyan (C), magenta (M), yellow (Y), and black (K), or vector data where RGB or CMYK are combined.

For example, in a case where color correction is conducted by using a multidimensional LUT such as a three-dimensional LUT having output values corresponding to $(D+1)^3$ lattice points wherein the range of input is equally divided into D parts in correspondence with each output channel, an output value is calculated by extracting a cubic lattice block (eight vertices) surrounding an input value(s) and performing interpolation on the values of the extracted eight vertices based on the relative coordinate values in the cubic lattice block (barycenter coordinate).

Although the simplest interpolation method is a method of performing eight point interpolation (trilinear interpolation) according to relative coordinate values in a cubic lattice block (for example, see Japanese Laid-Open Patent Application No. 7-099587, hereinafter referred to as "Patent Document 1"), this method has a problem of interpolation error causing ripples at gradations along the achromatic axis (grey axis), as taught in paragraph [0002] of Patent Document 1.

As taught in Patent Document 1, various methods of further dividing the cubic lattice block for preventing the problem of ripples are studied. According to the studies, it is known that the problem can be effectively prevented by providing a dividing boundary along a diagonal line of the cubic lattice block oriented in the grey axis direction.

For example, there is a method where a cubic lattice block is divided into three quadrangular pyramids around a single diagonal line of the cubic lattice block (for example, see Japanese Laid-Open Patent Application No. 58-016180, hereinafter referred to as "Patent Document 2"), a method where a cubic lattice block is divided into six triangular pyramids around a single diagonal line of the cubic lattice block by further dividing the three quadrangular pyramids of the aforementioned method (for example, see Japanese Laid-Open Patent Application Nos. 56-014237, 02-226867, and 03-229573, hereinafter referred to as "Patent Documents 3, 4, and 5", respectively), and a method where a cubic lattice block is divided into six quadrangular pyramids by a line connecting the body center and each vertex of the cubic lattice block (for example, see Japanese Laid-Open Patent Application No. 09-261499, hereinafter referred to as "Patent Document 6").

Although it is not specifically described in the above-described Patent Documents 1-6, in addition to ripples caused in the gradation of the grey axis direction, ripples caused in the gradation in the directions of primary color hues (C, M, Y, R, G, B) are also a problem.

Color printers used in the business field tend to have a mode for using C, M, Y as primary colors in order to provide the user with pure primary colors of C, M, Y for printing documents. However, the generation of ripples may result in color blending of color hues intended to be printed as primary colors. Therefore, in order to provide such a printing mode, it is desired to provide dividing lines oriented in the directions of frequently used primary color hues in order to prioritize linearity.

However, although dividing a cube along a single diagonal line of the cube or one of the squares of the cube may resolve ripples caused in the direction of the diagonal line (dividing line), there is a side-effect of causing anisotropy where ripples are generated in a direction perpendicularly intersecting the dividing line.

Thus, it is desired to provide a method that provides dividing lines along the directions of the grey axis and the axes of the primary color hues for prioritizing colors such as the primary color hues including frequently used C, M, Y or primary color components of monitors R, G, B, but at the same time, prevents the aforementioned problem of anisotropy.

Among the dividing methods disclosed in the Patent Documents 1-4 and 6, the only method which satisfies such a desire is the method described in Patent Document 3 where a cube is divided into 24 tetrahedrons (triangular pyramids) having the body-center of the cube as their center. However, with the method described in Patent Document 3 where the interpolation value corresponding to the body-center of the cube is the average value of its surrounding eight vertices, its interpolation characteristic becomes similar to that of the undesired trilinear interpolation. Therefore, this method is unable to sufficiently prevent ripples along a desired diagonal line.

Furthermore, since this method divides a cube into 24 blocks, in order to determine which input signal value belongs to which block, determination has to be conducted at least five times (five bits). From the aspect of hardware implementation, the increase in the number of times of determination results in enlargement of hardware logic circuits. From the aspect of software implementation, the increase in the number of times of determination results in increase of processing time. In addition, it is also necessary to used a shared process logic as much as possible in order to reduce cost.

Furthermore, color correction using a multidimensional LUT is conducted not only where there are three input channels (e.g., RGB) but also where there are four input channels (CMYK). Therefore, the method for preventing ripples is desired to be applied not only to three channels but expanded to four or more input channels.

SUMMARY OF THE INVENTION

The present invention may provide a color conversion apparatus and a color conversion method that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a color conversion apparatus and a color conversion method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a color conversion apparatus for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion apparatus including: a body-center value generating part for generating output values corresponding to a body-center of each cubic lattice block included in the three-dimensional input space; and an interpolating part for interpolating between the output values generated by the body-center value generating part and the LUT values; wherein the cubic lattice block is divided into six quadrangular pyramids, wherein each of the quadrangular pyramids is divided into two tetrahedron blocks by a side parallel to a predetermined straight line and by a plane including a diagonal line of a bottom plane that intersects the side parallel to the predetermined axis; wherein the corrected output values are determined by performing linear interpolation on output values corresponding to body-center points of each of the tetrahedron blocks and using the LUT values corresponding to three lattice points of each of the tetrahedron blocks and three correction coefficients based on a positional relationship of the input color signals inside each of the tetrahedron blocks.

Furthermore, another embodiment of the present invention provides a color conversion apparatus for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion apparatus including: an interpolating part for dividing each cubic lattice block included in the three-dimensional input space into a plurality of tetrahedron blocks and associating output values to four output values interpolated with four interpolation output values P* corresponding to four vertices of one of the plural tetrahedron blocks containing a point P; an output replacing part for replacing the four interpolation output values P* corresponding to the four vertices of one of the plural tetrahedron blocks; and an interpolation coefficient replacing part for replacing interpolation coefficients used for interpolating the four output values.

Furthermore, another embodiment of the present invention provides a color conversion apparatus for performing color conversion by using a lookup table indicative of LUT (Look-Up Table) values corresponding to lattice points of an n-dimensional input space including input color signals of n ($n \geq 3$) input channels and associating the lattice points to corrected output values by performing interpolation on the LUT values, the color conversion apparatus including: a body-center value generating part for generating output values corresponding to a body-center of each n-dimensional cubic lattice block included in the n-dimensional input space; and an interpolating part for interpolating between the output values generated by the body-center value generating part and the LUT values; wherein when $2^n$ vertices of the n-dimensional cubic lattice block have relative coordinates that are associated with binary numerals of n digits and expressed as [0 . . . 00], [0 . . . 01], [0 . . . 10], [0 . . . 11], . . . , [1 . . . 11], an n unit simplex having combinations of n+1 vertices forming a route from a starting point [0 . . . 00] to an ending point [1 . . . 11] without backtracking is divided into a first n unit simplex obtained by replacing the starting point with the body-center of a corresponding cubic lattice block and a second n unit simplex obtained by replacing the ending point with the body-center of another corresponding cubic lattice block, wherein the starting point is assumed as a vertex [0 . . . 00] in which all of its components are 0 and the ending point is assumed as a vertex [1 . . . 11] in which all of its components are 1, wherein the interpolating part performs linear interpolation on the output values corresponding to the body-centers of the obtained first and second simplexes.

Furthermore, another embodiment of the present invention provides a color conversion method for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion method including the steps of: a) generating output values corresponding to a body-center of each cubic lattice block included in the three-dimensional input space; and b) interpolating between the output values generated in step a) and the LUT values; wherein the cubic lattice block is divided into six quadrangular pyramids, wherein each of the quadrangular pyramids is divided into two tetrahedron blocks by a side parallel to a predetermined straight line and by a plane including a diagonal line of a bottom plane that intersects the side parallel to the predetermined axis; wherein the corrected output values are determined by performing linear interpolation on output values corresponding to body-center points of each of the tetrahedron blocks and using the LUT values corresponding to three lattice points of each of the tetrahedron blocks and three correction coefficients based on a positional relationship of the input color signals inside each of the tetrahedron blocks.

Furthermore, an embodiment of the present invention provides a color conversion method for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion method including the steps of: a) dividing each cubic lattice block included in the three-dimensional input space into a plurality of tetrahedron blocks; b) associating output values to four output values interpolated with four interpolation output values P* corresponding to four vertices of one of the plural tetrahedron blocks containing a point P; c) replacing the four interpolation output values P* corresponding to the four vertices of one of the plural tetrahedron blocks; and d) replacing interpolation coefficients used for interpolating the four output values.

Furthermore, another embodiment of the present invention provides a color conversion method for performing color conversion by using a lookup table indicative of LUT (Look-Up Table) values corresponding to lattice points of an n-dimensional input space including input color signals of n ($n \geq 3$) input channels and associating the lattice points to corrected output values by performing interpolation on the LUT values, the color conversion method including the steps of: a) generating output values corresponding to a body-center of each n-dimensional cubic lattice block included in the n-dimensional input space; and b) interpolating between the output values generated by the body-center value generating part and the LUT values; wherein when $2^n$ vertices of the n-dimensional cubic lattice block have relative coordinates that are associated with binary numerals of n digits and expressed as [0 . . . 00], [0 . . . 01], [0 . . . 10], [0 . . . 11], . . . , [1 . . . 11], an n unit simplex having combinations of n+1 vertices forming a route from a starting point [0 . . . 00] to an ending point [1 . . . 11] without backtracking is divided into a first n unit simplex obtained by replacing the starting point with the body-center of a corresponding cubic lattice block and a second n unit simplex obtained by replacing the ending point with the body-center of another corresponding cubic lattice block, wherein the starting point is assumed as a vertex [0 . . . 00] in which all of its components are 0 and the ending point is assumed as a vertex [1 . . . 11] in which all of its components are 1, wherein the step b) includes performing linear interpolation on the output values corresponding to the body-centers of the obtained first and second simplexes.

Other objects, features and advantages of the present invention will become more apparent from the following detailed description when read in conjunction with the accompanying drawings.

BRIEF DESCRIPTION OF THE DRAWINGS

FIG. 3 is a table showing an example of a relationship between address of point P and vertices of a tetrahedron block including point P;

FIG. 10 is a schematic diagram showing a relationship between an address signal $A_L$ and a color conversion table 30a according to an embodiment of the present invention;

FIGS. 24 through 26 show flowcharts of a color conversion operation according to an embodiment of the present invention.

DETAILED DESCRIPTION OF THE PREFERRED EMBODIMENTS

<Overview of Present Invention>

Figure 1:
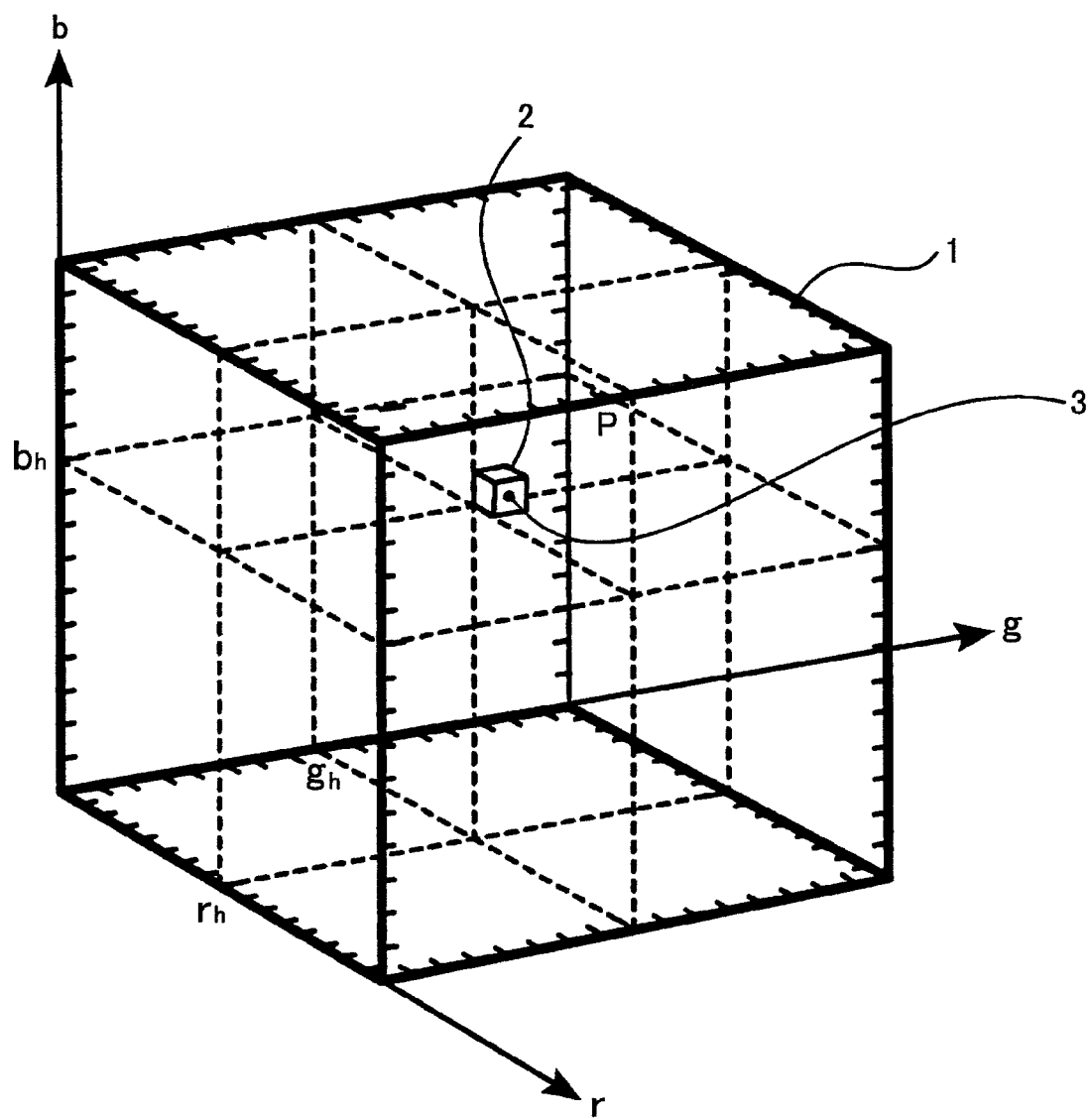
FIG. 1 is a schematic diagram showing an input space used for color conversion according to an embodiment of the present invention.

First, an overview of the present invention is described. According to an embodiment of the present invention, a cubic lattice block of a three dimensional LUT (Look Up Table) is divided into six quadrangular pyramids by four dividing lines that connect the body-center of the cubic lattice block and the eight vertices of the cubic lattice block. Furthermore, each of the quadrangular pyramids is divided into two tetrahedrons by a side parallel to the grey axis and by a plane including a diagonal line of a bottom plane that intersects the side parallel to the grey axis, so that the cubic lattice block is divided into 12 tetrahedron blocks (for example, see FIG. 2). Then, linear interpolation is performed on the 12 tetrahedron blocks. Furthermore, the average of LUT values corresponding to the vertices of the cubic lattice block that satisfies a predetermined relationship (a relationship having the same equivalency as that of the coordinate values of the body-centers of the tetrahedrons) are assigned to the output values of the tetrahedrons. Thereby, the precision of interpolation can be improved by using the average of the LUT values.

In a case of implementing the present invention as a color conversion apparatus, the color conversion apparatus includes, for example, a body-center value generating part for obtaining the average of LUT values corresponding to the vertices of a cubic lattice block having an equivalence relationship which is the same as that of the body-centers of the tetrahedron blocks and assigning the obtained average as the output value of the body-centers of the tetrahedrons, an address generating part for generating addresses used for referring to the vertices and the body-centers of the tetrahedrons from the three-dimensional LUT, an output replacing part for replacing (rearranging) the values corresponding to the vertices of the tetrahedron blocks that are output from the three-dimensional LUT, and a correction coefficient replacing part which perform rearrangement and inversion on the lower (N-s) bit signals (rL, gL, bL) of each input signal.

Hence, since linear interpolation on the values of the LUT lattice points on the initial grey axis is achieved by using this dividing method and the piecewise linear interpolation using values assigned to the body-centers of the divided tetrahedron blocks, generation of ripples on the grey axis (R=G=B) can be sufficiently prevented.

On the cyan hue plane and the red hue plane (G=B plane), since the interpolation value is determined without being affected by the values of adjacent vertices in the green (G) direction and the blue (B) direction and the adjacent vertices in the magenta (M) direction and the yellow (Y) direction, color blending due to generation of ripples can be prevented. Thus, the brightness of primary colors can be maintained. In addition, the same effects can be attained on the magenta color hue plane (R=B plane) and the yellow color hue plane (R=G plane).

In providing dividing lines in the CMYRGB primary color hue directions and the grey axis direction, it is necessary to divide the cubic lattice block into at least six parts along the primary color hues of CMYRGB where the grey axis is the center. Furthermore, in order to make one of the vertices be a body-center, the above-described dividing method is the minimal division because it is necessary to further divide each of the divided parts into two parts along the grey axis.

Furthermore, in this case of implementing the present invention as a color conversion apparatus, since an appropriate address of the vertices of the tetrahedrons (including arrangement of the vertices of the tetrahedrons) is generated by the address generating part and the values corresponding to the vertices of the tetrahedrons are rearranged, a common (shared) interpolating part can be used even for tetrahedron blocks that are oriented differently. Therefore, the logic of the interpolating part can be simplified. Furthermore, the output replacing part, which appropriately rearranges data of the vertices, can be easily realized. Therefore, the address generating part can be simplified and the logic circuit size can be reduced.

Next, a color conversion apparatus, a color conversion method, and a color conversion program according to an embodiment of the present invention are described in further detail. For the sake of convenience (simplification), input signals of three channels are expressed as (r, g, b) in the following embodiment of the present invention. Furthermore, the output channel is a single output channel expressed as (P) in the following embodiment of the present invention.

It is to be noted that although the following embodiment of the present invention describes a case where the output channel is a single channel, this can be generally applied to multiple output channels by, for example, increasing the number of output channels or by changing the internal setting value and repetitively using the single output channel.

<Schematic Diagram of Input Space used for Color Conversion>

FIG. 1 is a schematic diagram showing an input space 1 used for color conversion according to an embodiment of the present invention. FIG. 1 shows an example 17×17×17 grid in which each input channel is divided into sixteen parts (see, r vector, g vector, b vector). Thus, each input value (r, g, b) of the corresponding R, G, B channel of the input space 1 is 16 bits, that is, each input value (r, g, b) is provided with an integer value ranging from 0 to 65,535. According to an embodiment of the present invention, the coordinate value in the input space 1 may also be referred to as an "address".

With the color conversion apparatus according to an embodiment of the present invention, an output value P* corresponding to each point (r, g, b) in the input space 1 (P* (r, g, b)) is obtained as a suitable output value by using a below-described three-dimensional LUT and performing interpolation according to a value obtained by using the three-dimensional LUT. In this example, the three-dimensional LUT includes output values of 17×17×17 lattice points where each input channel is divided into D (e.g., D=16) parts {(16$i$, 16$j$, 16$k$) ; i, j, k=0, 1, . . . , 16}.

In this example, the addresses of eight vertices of a cubic lattice block 2 including input RGB values 3 are generated by using the upper four bit values of (r, g, b) as a base address, and adding offset addresses of (0, 0, 0), (0, 0, 1), (0, 1, 0), (0, 1, 1), (1, 0, 0), (1, 0, 1), (1, 1, 0), and (1, 1, 1) to the base address.

Figure 2:
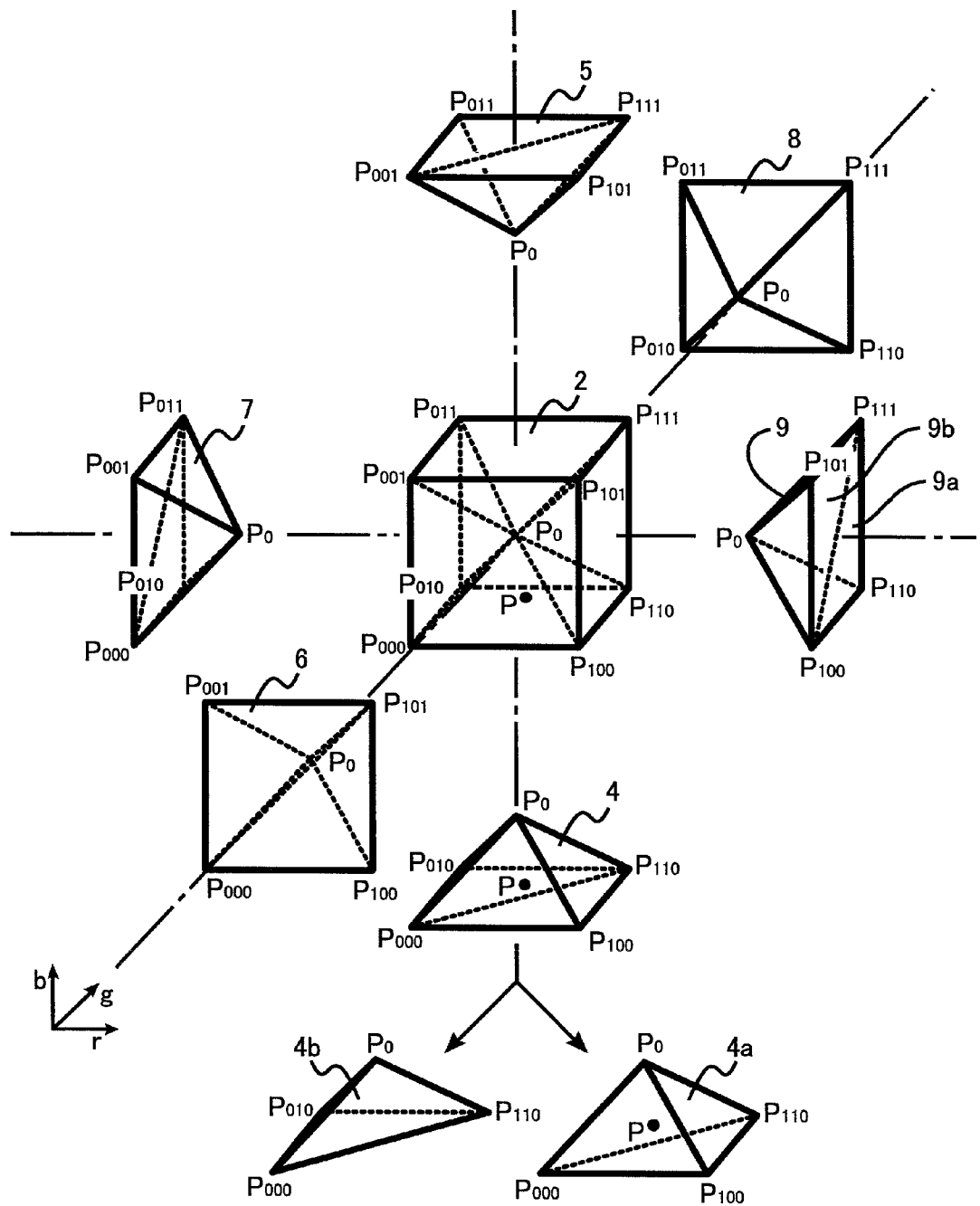
FIG. 2 is a schematic diagram for describing a method of dividing a cubic lattice block according to an embodiment of the present invention.

FIG. 2 is a schematic diagram for describing a method of dividing a cubic lattice block according to an embodiment of the present invention. In FIG. 2, the symbols $P_{ijk}$ denoted for each vertex represents the vertices corresponding to the offset addresses (i, j, k) without the base address added thereto. The address "$P_{ijk}$" may also be indicated as P[ijk]. For the sake of convenience (simplification), the asterisk of output value "P*" corresponding to point P is omitted, such that the vertex of the input space 1 or its corresponding output value is indicated as reference numeral "S".

Furthermore, in the cubic lattice block 2 shown in FIG. 2, a diagonal line P000P111 parallel to the grey axis (R=G=B) is referred to as "main diagonal line". Furthermore, each diagonal line of each side plane P000P110, P000P101, P000P011, P000P111, P111P001, P111P010, P111P100 which intersects the main diagonal line $P_{000}P_{111}$ is referred to as a "side plane main diagonal line".

The cubic lattice block 2 shown in FIG. 2 is divided into six quadrangular pyramids 4-9 that are formed by connecting each plane of the cube to a body-center point $P_0$. Furthermore, each quadrangular pyramid 4-9 is divided into two parts by a plane including a side plane main diagonal line and the body-center point $P_0$ in a manner shown with tetrahedrons 4a, 4b, 9a, and 9b. Accordingly, the cubic lattice block 2 is divided into 12 tetrahedron blocks. With this dividing method, the main diagonal line and each side plane main diagonal line matches the ridge lines of one of the 12 tetrahedron blocks.

Next, a relationship between the address of the point P and the vertices of the tetrahedron block to which point P belongs (tetrahedron block containing point P) is described with reference to FIG. 3. The vertices of the tetrahedron block are distinguished according to the size relationship (greater than or less than) of the lower four bits ($r_L$, $g_L$, $b_L$) of the address (r, g, b) of point P and also according to whether the sum of their maximum value and minimum value is less than an interval of the grid $d_g$.

For example, in a case where $r_L > g_L$ and $r_L > b_L$ is true (1) and $g_L > b_L$ is false (0), it is determined that point P is contained in the tetrahedron $P_0 P_{111} P_{101} P_{100}$ (tetrahedron block 9b of FIG. 2) if max+min<$d_g$ is false where the maximum value max=$r_L$ and the minimum value min=$g_L$.

Regarding the vertices {$P_s$, $P_m$, $P_L$} selected (designated) in correspondence with each relationship shown in FIG. 3, the vertices corresponding to, for example, a relationship $r_L > g_L > b_L$ are four points P [000], P [100], P [110], P[111].

These four points form a route P [000] to P [111] without any backtrack (a route formed without going back over the course by which it has traveled). That is, within this combination of four points, the tetrahedron having point P [111] replaced with $P_0$ corresponds to tetrahedron block 4a, and the tetrahedron having point P [000] replaced with $P_0$ corresponds to tetrahedron block 9a (described in detail below with FIG. 4). In other words, FIG. 3 is indicative of all combinations of the routes from point P [000] to P [111].

Accordingly, in order to expand the use of this dividing method to a case of n dimensions, the dividing method can be performed as follows. First, relative coordinates of $2^n$ vertices of an n-dimensional cubic lattice block are associated with binary numerals of n digits, so that they are expressed as [0...00], [0...01], [0...10], [0...11], ..., [1...11]. Then, an n unit simplex having combinations of n+1 vertices forming a route from the point [0...00] to the point [1...11] without backtracking (where the starting point is a vertex [0...00] in which all of its components are 0, and the ending point is another vertex [1...11] in which all of its components are 1) is divided into a first n unit simplex obtained by replacing the starting point with the body-center and a second n unit simplex obtained by replacing the ending point with the body-center.

In this example, "n unit simplex" refers to a triangle expanded into n dimensions, and more specifically a minimum convexity set including n+1 independent points. Thus, for example, two unit simplexes correspond to a flat (two-dimensional) triangle, and three unit simplexes correspond to a tetrahedron.

The number of divided parts of an n dimensional cubic lattice block divided by this method is two times the routes from the starting point to the ending point (n ! routes). Therefore, the number of divided parts increases as a factorial with respect to the dimension. For example, in a case of a three dimensional cubic lattice block, the block is divided into 12 parts (2×3 !). In a case of a four dimensional cubic lattice block, the block is divided into 48 parts (2×4 !). Thus, it may be unrealistic to consider input channels exceeding five dimensions.

<Interpolation Method>

Figure 4:
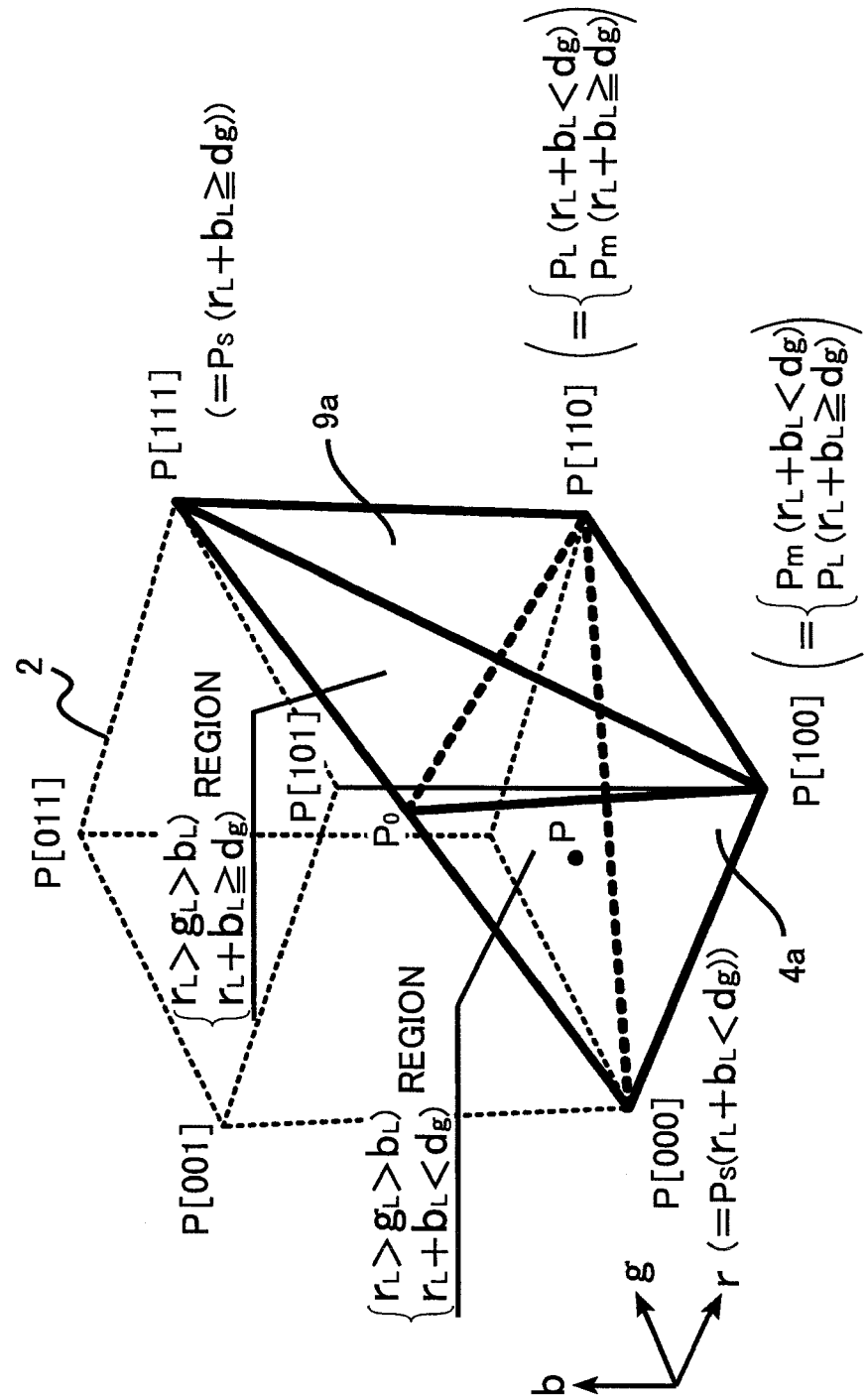
FIG. 4 is a schematic diagram for describing an interpolation method according to an embodiment of the present invention.

Next, an interpolation method is described with reference to FIG. 4. FIG. 4 is a schematic diagram for describing an interpolation method according to an embodiment of the present invention. The interpolation method is described using an exemplary case where point P is located inside the tetrahedron 4a block of the cubic lattice block 2, that is, a case where there is a relationship of $r_L > g_L > b_L$ when max+min=$r_L + b_L < d_g$.

Figure 5:
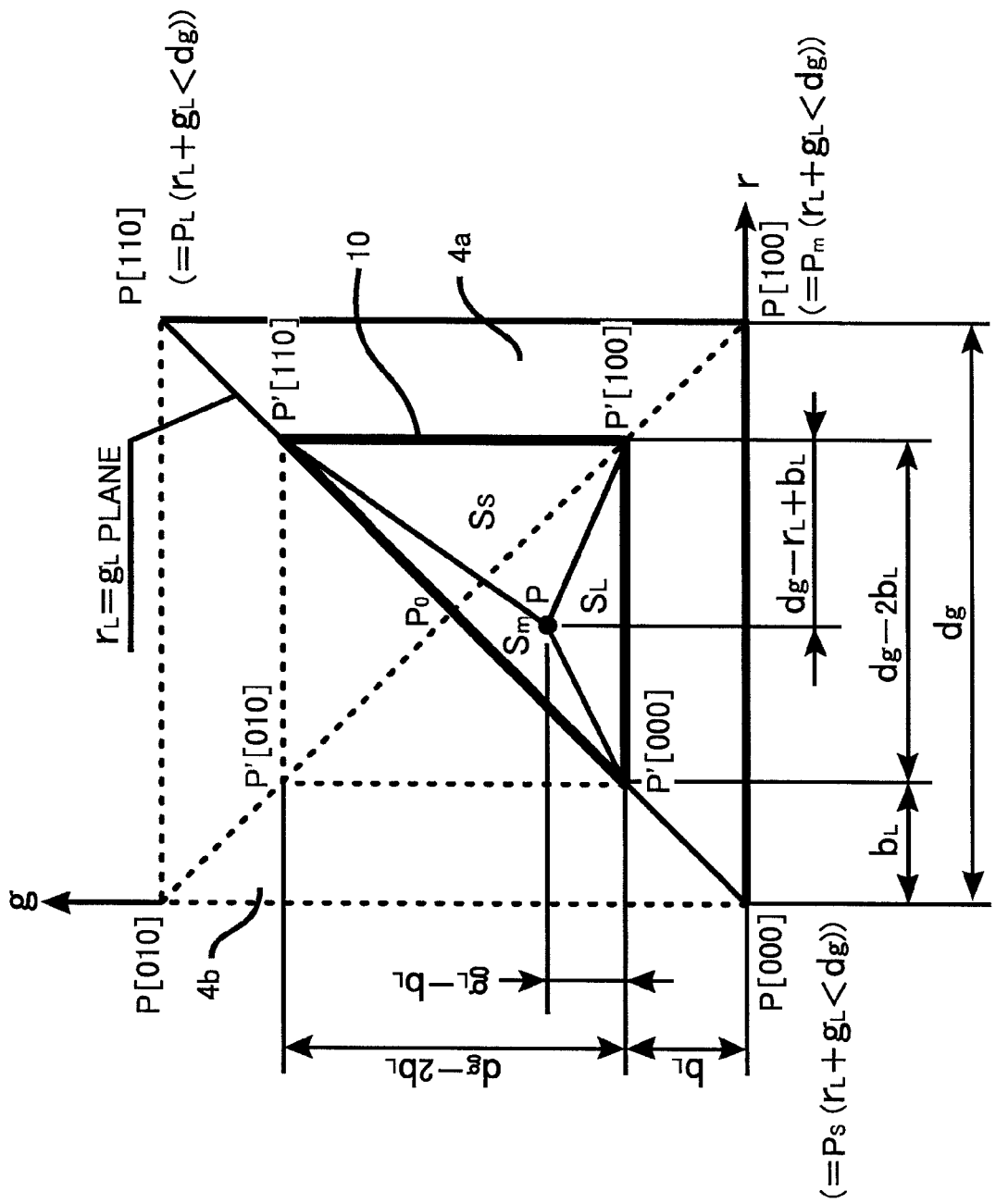
FIG. 5 is a schematic diagram showing a cross section along the $b=b_L$ plane that passes through point P of the cubic lattice block of FIG. 4.

FIG. 5 is a schematic diagram showing a cross section along the b=$b_L$ plane that passes through point P of the cubic lattice block of FIG. 4. As shown in FIG. 5, the vertices of the cross sections of the tetrahedron blocks 4a, 4b are assumed as P'[000], P'[100], P'[110], and P'[010] with respect to corresponding vertices of the cubic lattice block 2.

In this case, the output value P is interpolated by using the following formula (1) using output values corresponding to the assumed vertices.

$$P=(S_s P''[000]+S_m P'[100]+S_L P'[110])/(S_s+S_m+S_L) \quad \text{[Formula 1]}$$

It is to be noted that "$S_s$", "$S_m$" and "$S_L$" in Formula 1 each represents the area of the corresponding region shown in FIG. 5.

Furthermore, corresponding values are assigned to P'[000], P'[100], and P'[110] by using the following linear interpolation formula (Formula 2)

$$P'[000]=(1-2b_L/d_g)P[000]+(2b_L/d_g)P_0$$

$$P'[100]=(1-2b_L/d_g)P[100]+(2b_L/d_g)P_0$$

$$P'[110]=(1-2b_L/d_g)P[110]+(2b_L/d_g)P_0 \quad \text{[Formula 2]}$$

By sorting these relationships, a corresponding value can be assigned to the output value P by using the following Formula 3.

$$P=\{2b_L P_0+(d_g-r_L-b_L)P[000]+(r_L-g_L)P[100]+(g_L-b_L)P[110]\}/d_g \quad \text{[Formula 3]}$$

These relationships can be more commonly expressed as a formula (Formula 4) corresponding to combinations of the vertices $P_S$, $P_m$, $P_L$ of a selected (designated) tetrahedron block according to the table shown in FIG. 3 using the minimum value $n_s$, the intermediate value $n_m$, the maximum value $n_L$ of the offset addresses and determining true or false of $n_L + n_s < d_g$.

$$P=\{2n_S P_0+(d_g-n_L-n_S)P_S+(n_L-n_m)P_m+(n_m-n_S)P_L\}/d_g \quad \text{[Formula 4]}$$

It is, however, to be noted that, when $n_L + n_S < d_g$ is false, Formula 4 is applied by replacing $n_S$, $n_m$, and $n_L$ with the $n_S'=d_g-n_L$, $n'_m=d_g-n_m$, and $n_L$ with $n_L'=d_g-n_S$, respectively.

<Examples of Configuration of Color Conversion Apparatus>

Next, embodiments of a configuration of a color conversion apparatus for realizing the above-described interpolating relationship are described.

First Embodiment

Color Conversion Apparatus

Figure 6:
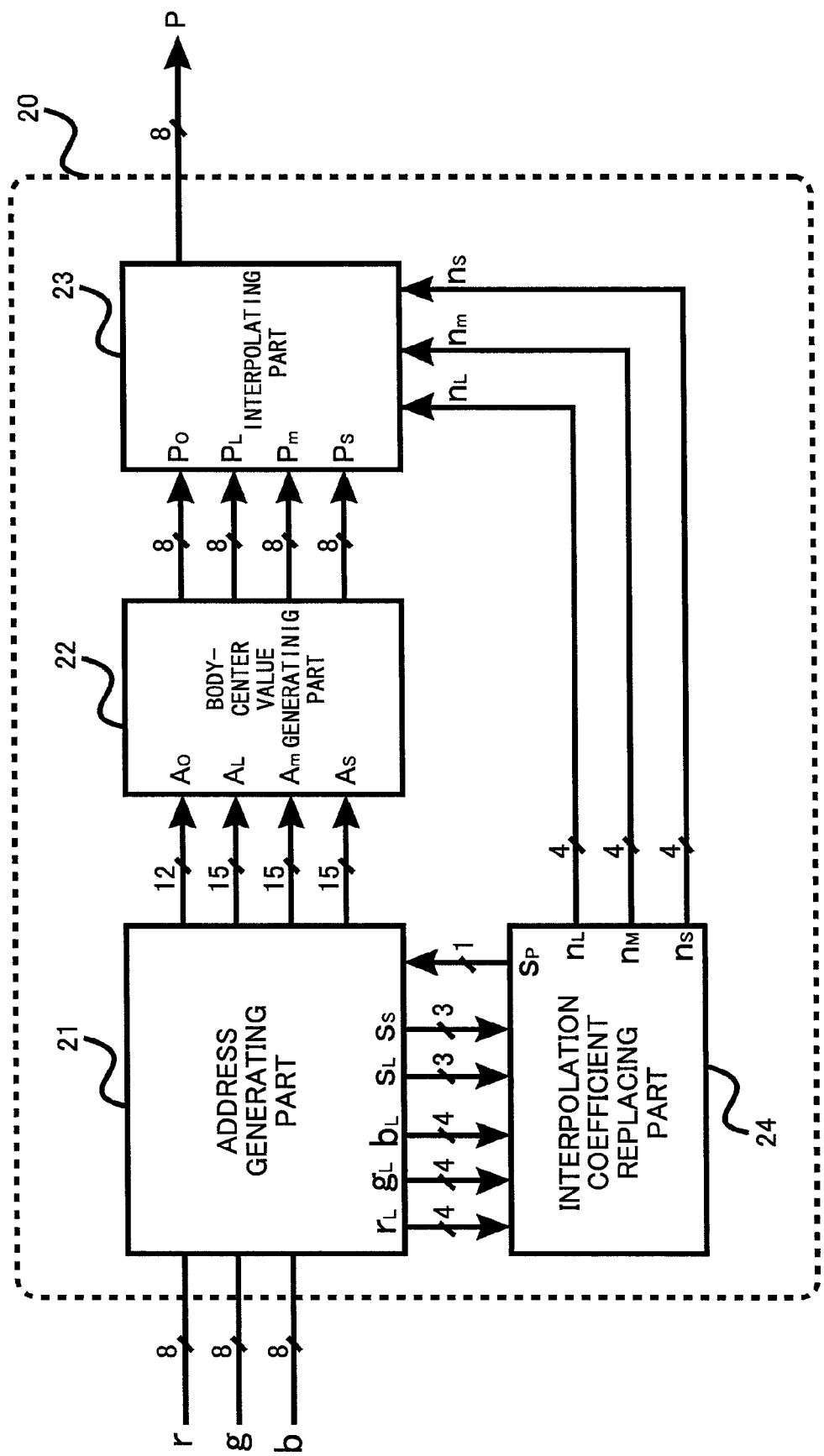
FIG. 6 is a schematic diagram showing a color conversion apparatus according to a first embodiment of the present invention.

FIG. 6 shows a color conversion apparatus 20 according to a first embodiment of the present invention. The color conversion apparatus 20 includes, for example, an address generating part 21, an interpolating part 23, and an interpolation coefficient replacing part 24. The numerals indicated on the arrows of FIG. 6 represent numbers of transmitted bits.

The address generating part 21 has an address table provided therein. The address generating part 21 is configured to generate addresses $A_0$, $A_S$, $A_m$, $A_L$ used for selecting (designating) the above-described vertices $P_0$, $P_S$, $P_m$, $P_L$ of a tetrahedron block according to the table shown in FIG. 3 by using the upper four bit signals ($r_h$, $g_h$, $b_h$) of input (r, g, b) signals and an $_{SP}$ value transmitted from the interpolation coefficient replacing part 24.

The body-center value generating part 22 is configured to generate vertex data $P_0$, $P_S$, $P_m$, $P_L$ by using a below-described color conversion table with the addresses $A_0$, $A_S$, $A_m$, $A_L$ obtained from the address generating part 21. Furthermore, the interpolating part 23 is configured to calculate the output value P by using the above-described interpolation method based on the vertex data $P_0$, $P_S$, $P_m$, $P_L$ obtained from the body-center value generating part 22.

The interpolation coefficient replacing part 24 is configured to generate interpolation coefficients $n_s$, $n_m$, $n_L$ by rearranging, for example, the lower four bit signals ($r_L$, $g_L$, $b_L$) of the input signals (r, g, b) based on a largest value selection signal $S_L$ and a smallest value selection signal $S_s$ generated by the address generating part 21 and performing a complementary operation (according to necessity) on the rearranged signals.

Next, the address generating part 21 and the interpolation coefficient replacing part 24 are described in further detail.

Figure 7:
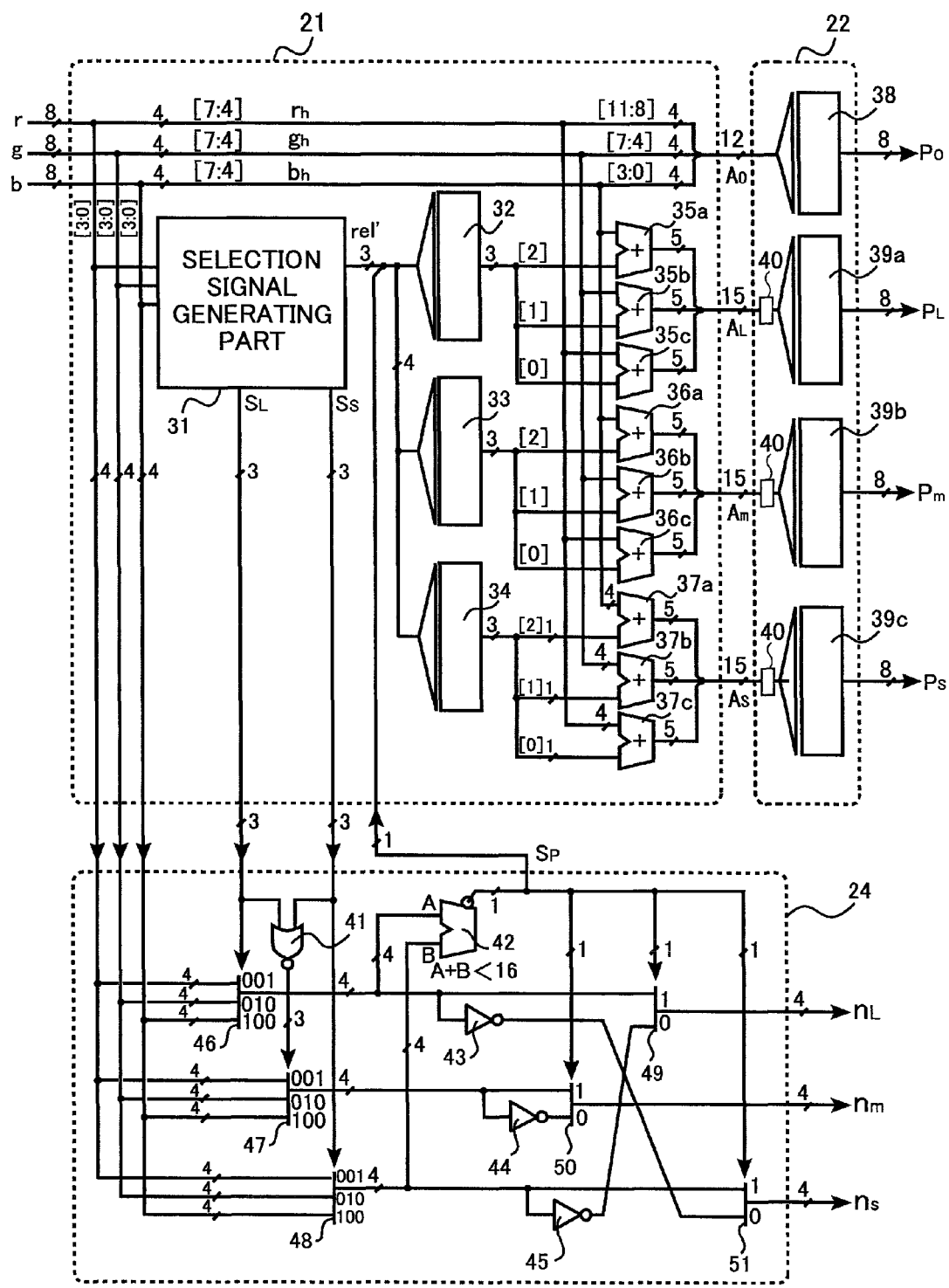
FIG. 7 is a schematic diagram showing a detailed configuration of a address generating part, a body-center value generating part, and a interpolation coefficient replacing part according to an embodiment of the present invention.

FIG. 7 shows a detailed configuration of the address generating part 21, the body-center value generating part 22, and the interpolation coefficient replacing part 24 according to an embodiment of the present invention.

In FIG. 7, the address generating part 21 includes a selection signal generating part 31, address tables 32 through 34, and comparators 35 through 37. The body-center value generating part 22 includes a LUT 38, a color conversion table 39, and an address converting part 40. Furthermore, the interpolation coefficient replacing part 24 includes a NOR circuit 41, an adder (adding circuit) 42, NOT circuits 43 through 45, and selection circuits 46 through 51.

In the address generating part 21, the selection signal generating part 31 generates selection signals to be used for color conversion (color conversion selection signals) according to the lower four bit signals (indicated as [3:0] in FIG. 7) of each input signal r, g, b.

Figure 8:
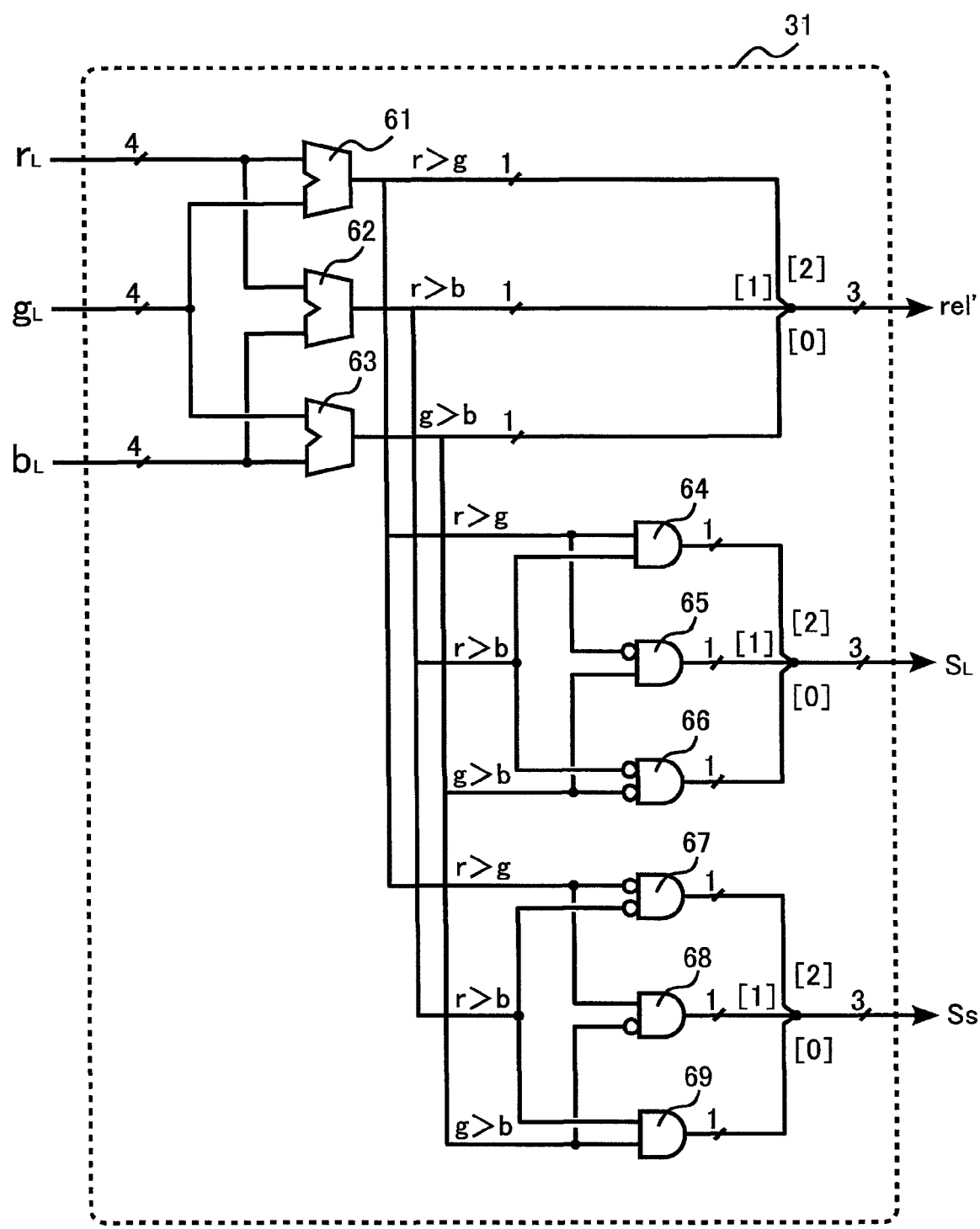
FIG. 8 is a schematic diagram showing a configuration of a selection signal generating part according to an embodiment of the present invention.

FIG. 8 is a schematic diagram showing a configuration of the selection signal generating part 31 according to an embodiment of the present invention. The selection signal generating part 31 shown in FIG. 8 includes comparators 61 through 63 and AND circuits 64 through 69.

In the example shown in FIG. 8, the lower four bits of input color signals ($r_L$, $g_L$, $b_L$) of the color conversion apparatus 20 are assumed as input signals. Among the input color signals, the comparator 61 compares $r_L$ and $g_L$. The comparator 61 outputs a single bit value of 1 when $r_L > g_L$ is true and outputs a single bit value of 0 when $r_L > g_L$ is false. Likewise, the comparator 36 compares $r_L$ and $b_L$. The comparator 36 outputs a single bit value of 1 when $r_L > b_L$ is true and outputs a single bit value of 0 when $r_L > b_L$ is false. Likewise, the comparator 37 compares $g_L$ and $b_L$. The comparator 37 outputs a single bit value of 1 when $g_L > b_L$ is true and outputs a single bit value of 0 when $g_L > b_L$ is false.

An output value rel' of the interpolation coefficient replacing part 24 is a three bit signal combining the comparison results. The output of the comparator 61 (determination value of $r_L > g_L$) is the second bit ([2]) of the three bit signal. The output of the comparator 36 (determination value of $r_L > b_L$) is the first bit ([1]) of the three bit signal. The output of the comparator 37 (determination value of $g_L > b_L$) is the $0^{th}$ bit ([0]) of the signal.

Furthermore, the output value $S_L$ is a three bit signal combining logical NOTs and logical ANDs output from the AND circuits 64 through 66 with respect to each output signal of the comparators 61 through 63. In a case where both '$r_L > g_L$ and $r_L > b_L$' are satisfied (i.e. when $r_L$ is largest), the determination value is the second bit ([2]) of the three bit signal. In a case where both '$r_L \leq g_L$ and $g_L > b_L$' are satisfied (i.e. when $g_L$ is largest), the determination value is the first bit ([1]) of the three bit signal. In a case where both '$r_L \leq g_L$ and $g_L > b_L$' are satisfied (i.e. when $b_L$ is largest), the determination value is the $0^{th}$ bit ([0]) of the three bit signal.

Likewise, the output value $S_S$ is a three bit signal combining logical NOTs and logical ANDs output from the AND circuits 67 through 69 with respect to each output signal of the comparators 61 through 63. In a case where both '$r_L \leq g_L$ and $r_L \leq b_L$' are satisfied (i.e. when $r_L$ is smallest), the determination value is the second bit ([2]) of the three bit signal. In a case where both '$r_L > g_L$ and $g_L \leq b_L$' are satisfied (i.e. when $g_L$ is smallest), the determination value is the first bit ([1]) of the three bit signal. In a case where both '$r_L > b_L$ and $g_L > b_L$' are satisfied (i.e. when $b_L$ is smallest), the determination value is the $0^{th}$ bit ([0]) of the three bit signal. The above-described output signal $S_L$ acts as a maximum value selection signal with respect to the hunter circuit 46 of FIG. 7, and the output signal $S_S$ acts as a minimum value selection signal with respect to the hunter circuit 48 of FIG. 7.

Returning to FIG. 7, the address generating part 21 of FIG. 7 outputs the lower four bits ($r_L$, $g_L$, $b_L$) of the input signals, and the maximum value selection signal $S_L$ and the minimum value selection signal $S_S$ of the selection signal generating part 31 to the interpolation coefficient replacing part 24. The NOR circuit 41 of the interpolation coefficient replacing part 24 generates an intermediate value selection signal $S_m$ for the hunter circuit 47 according to the maximum value selection signal $S_L$, the minimum value selection signal $S_S$.

The adder 42 is configured to invert a carry flag generated when the sum of the maximum value A selected by the selection circuit 48 and the minimum value B selected by the selection circuit 50 is no less than the value of the grid interval $d_g$ (in this embodiment, 16) and output the carry flag, so that $_{SP}=1$ in a case where a relationship of $A+B<d_g$ is satisfied and $_{SP}=0$ in a case besides the case where the relationship of $A+B<d_g$ is satisfied.

In accordance with the output value $_{SP}$ of the adder 42, the selection circuits 48, 50, and 51, output the output values of the selection circuit 48 (maximum value), the output of the selection circuit 49 (intermediate value), and the output of the selection circuit 50 (minimum value) without inverting the output values when $_{SP}=0$. When $_{SP}=1$, the output values are inverted (i.e. converted from 1 to 0 or converted from 0 to 1) via the NOT circuits 32, 33, 34. The inverted output values are rearranged so that the maximum and minimum values are correctly output as interpolation coefficients $n_L$, $n_m$, and $n_S$.

Accordingly, in a case where the sum of the maximum value A and the minimum value B of $r_L$, $g_L$, $b_L$ satisfies a relationship of $A+B<d_g$, nL, nm, nS each correspond to the maximum value, the intermediate value, and the minimum value of $r_L$, $g_L$, and $b_L$. In a case where the sum of the maximum value A and the minimum value B of $r_L$, $g_L$, $b_L$ satisfies a relationship of $A+B>d_g$, nL, nm, nS each correspond to the compliment of the maximum value, the intermediate value, and the minimum value of $r_L$, $g_L$, and $b_L$.

The address table 32 of the address generating part 21 corresponds to the address table indicated with broken lines in the table of FIG. 3. That is, assuming that the upper three bits of the four bits of the input signal is the output signal rel' from the selection signal generating part 31 and that the lower single bit of the input signal is the output signal (switching signal) of the adder 42 of the interpolation coefficient replacing part 24, the address table 32 outputs corresponding three bit offset address values.

It is to be noted that an output replacing part for replacing an output value is realized by the signal rel' (upper three bits) and the switching signal $_{SP}$ (lower single bit) input to the address table 32 and the table configuration shown in FIG. 3. In other words, the output replacing part can be implemented by providing redundancy in the lookup table and assuming that the switching signal $_{SP}$ as part of an address.

The adder 35a outputs a five bit value obtained by adding the highest value of the three bit outputs of the address table 32 to the base address $r_h$. Likewise, the adder 35b outputs a five bit value obtained by adding the intermediate value of the three bit outputs of the address table 32 to the base address $g_h$. Likewise, the adder 35c outputs a five bit value obtained by adding the lowest value of the three bit outputs of the address table 32 to the base address $b_h$. The output values of the adders 35a, 35b, and 35c are combined from the higher bits in this order, to thereby generate an address signal $A_L$ of 15 bits. The color conversion table 39a outputs a value corresponding to the vertex $P_L$ of the above-described tetrahedron block according to the generated address signal $A_L$.

By performing the above-described process in the same manner, an address signal $A_m$ is generated by using the address table 33 and the adders 36a-36c. The color conversion table 39b outputs a value corresponding to the vertex $P_m$ of the above-described tetrahedron block according to the generated address signal $A_m$. Likewise, an address signal $A_s$ is generated by using the address table 34 and the adders 37a-37c. The color conversion table 39c outputs a value corresponding to the vertex $P_s$ of the above-described tetrahedron block according to the generated address signal $A_s$.

The color conversion tables 39a-39c, which associate output values with respect to corresponding lattice points of an input space beforehand, may be an LUT having the same content. Therefore, memory space can be saved by shifting the timing of reading out the LUT so that reference can be made to the same LUT. Alternatively, three LUT of the same content may be prepared so that simultaneous reference can be made to $P_L$, $P_m$, $P_S$, for example. Thereby, implementation prioritizing execution speed can be achieved.

The LUT 38, acting as the body-center value generating part for generating values corresponding to the body-center point $P_0$, stores predetermined values according to the data of the color conversion table 39a.

In a case where an input value $A_0$ satisfying a relationship of $r_h=g_h=b_h$, an average value of two vertices satisfying the relationship $(r_h=g_h=b_h)$ in a cubic lattice block having a base address of $(r_h, g_h, b_h)$ is obtained (P[000]+P[111]/2). Likewise, in a case where an input value $A_0$ satisfies a relationship of $r_h=g_h$, an average value of four vertices satisfying the relationship $(r_h=g_h)$ in the cubic lattice block having the base address of $(r_h, g_h, b_h)$ is obtained (P[000]+P[001]+P[110]+P[111]/4).

Likewise, in a case where an input value $A_0$ satisfies a relationship of $r_h=b_h$, an average value of four vertices satisfying the relationship $(r_h=b_h)$ in the cubic lattice block having the base address of $(r_h, g_h, b_h)$ is obtained (P[000]+P[010]+P[101]+P[111]/4). Likewise, in a case where an input value $A_0$ satisfies a relationship of $g_h=b_h$, an average value of four vertices satisfying the relationship $(g_h=b_h)$ in the cubic lattice block having the base address of $(r_h, g_h, b_h)$ is obtained (P[000]+P[100]+P[011]+P[111]/4). In other cases where there is no equivalence relationship between $r_h$, $g_h$, $b_h$, the average of all of the eight vertices of the cubic lattice block is obtained.

Although the above-described embodiment of the present invention is explained by using an example where there are three input channels, it may be applied to a case where there are n channels. The method of designating the value of the body-center of an n-dimensional cube is the same as the case of three input channels. That is, the value of the body-center of the n-dimensional cube is designated by selecting an equivalence relationship satisfied by the base address of the n-dimensional cubic lattice block as the condition of the offset address used for selecting corresponding vertices of the cubic lattice block and obtaining the average of the output values of the selected vertices. The equivalence relationship satisfied by the base address may be considered the same as an equivalence relationship satisfied by coordinates of a body-center obtained as the average of the coordinates of $2^n$ vertices of an n-dimensional cubic lattice.

Next, the lookup table and the relationship between the address signal $A_L$ and the color conversion table 39a are described below.

In the above-described example shown in FIG. 7, providing the output of adders with a range of five bits causes the addresses of 17 to 31 to be wasted because the outputs of the adders 35-37 only have values from 0 to 16. Furthermore, the method of using combinations of three five-bit values as addresses in the address space causes the address space to become approximately eight times greater than the actual necessary address space. Therefore, in this embodiment of the present invention, the address converting part 40 is provided for performing a predetermined calculation on the addresses and generating addresses converted by the calculation. With the address converting part 40, address conversion of $A_L$, $A_m$, and $A_S$ can be performed by using the same logic.

Figure 9:
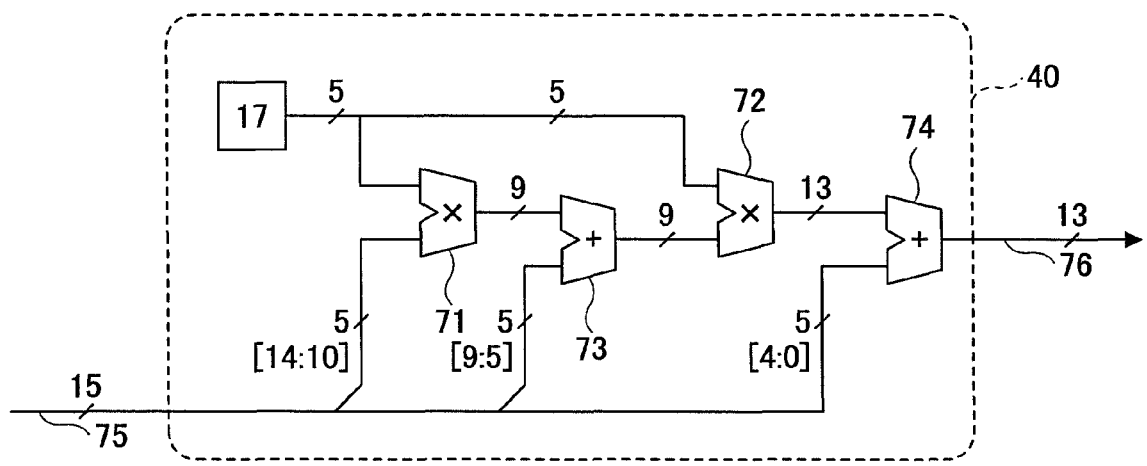
FIG. 9 is a schematic diagram showing a configuration of a address converting part according to an embodiment of the present invention.

FIG. 9 is a schematic diagram showing a configuration of the address converting part 40 according to an embodiment of the present invention. In this embodiment, the address converting part 40 includes multiplication circuits 71, 72, and adders 73, 74.

In the address converting part 40, the multiplication circuit 71 multiplies the upper five bits of a 15 bit input signal 75 (indicated as [14:10] in FIG. 9) by 17 (=D+1). Then, the adder 73 adds the multiplication results with the intermediate five bits of the input signal 75 (indicated as [9:5] in FIG. 9). Then, the multiplication circuit 72 multiplies the addition results by 17. Finally, the adder 74 adds the multiplication results with the lower five bits of the input signal 75. Thereby, an output signal of 13 bits can be obtained. Accordingly, in a case where the upper five bits, the intermediate five bits, and the lower five bits of the input signal 75 are indicated as i, j, and k, the output signal is $17^2 \times i + 17 \times j + k$. Thus, (i, j, k) can be regarded as an index of an array of three components corresponding to i, j, k having a range of 0-16, respectively.

FIG. 10 is a schematic diagram showing a relationship between the address signal $A_L$ and the color conversion table 39a according to an embodiment of the present invention. In a case where, for example, the color space of the output is an RGB color space, the components in the color conversion table 39a correspond to the output values P of one of the output channels R, G, and B. The output value P to be associated to (i, j, k) can be assigned as P[i, j, k] beforehand when $A_L$ is divided into five bits each (i, j, k) in the case where (i, j, k) are regarded as an index of an array of three components corresponding to i, j, k.

It is to be noted that although P is described as one of the multi-channel output values, P may be vector data having R, G, and B combined as long as bit length can be sufficiently matched.

<Interpolating Part 23>

Figure 11:
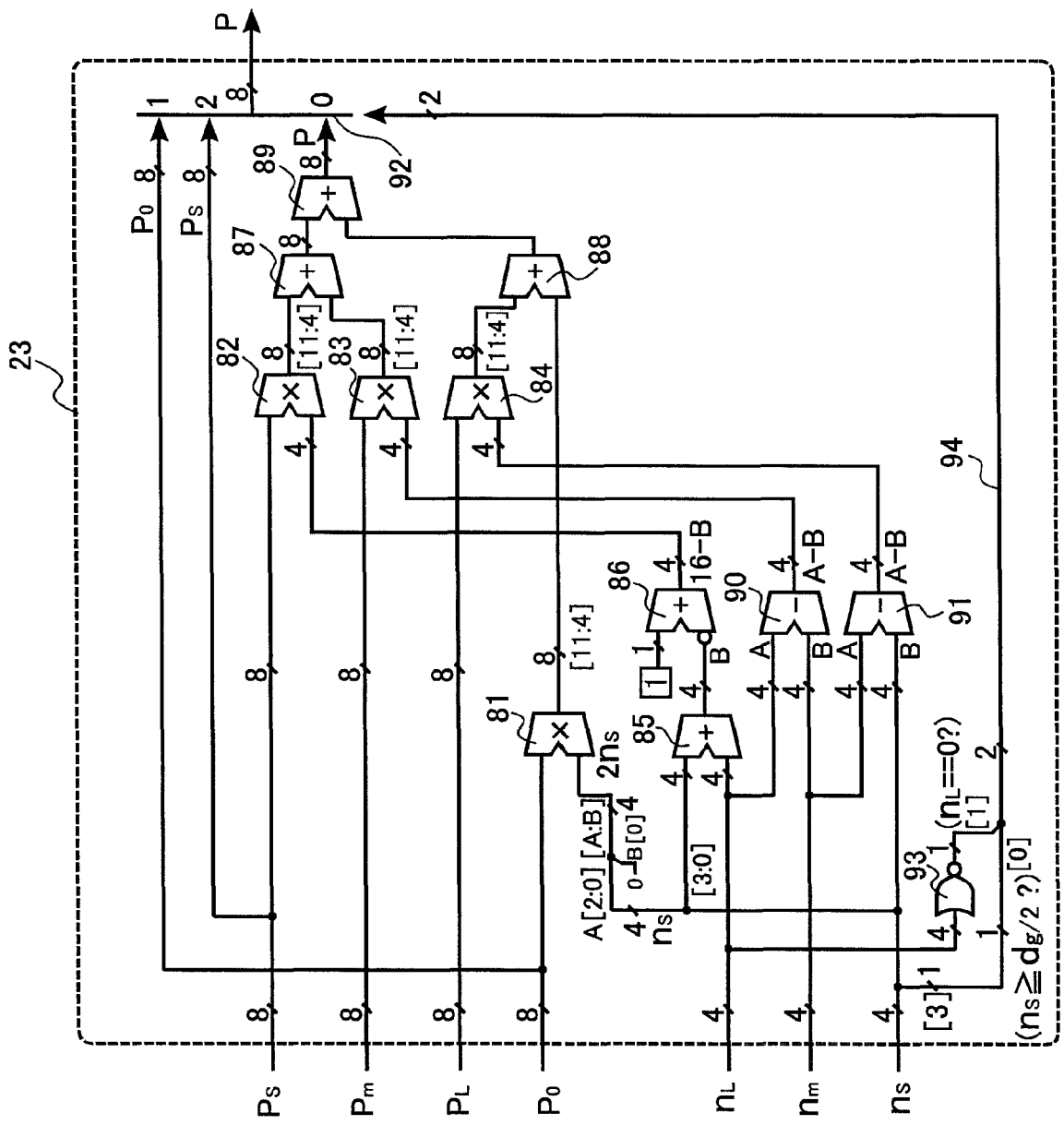
FIG. 11 is a schematic diagram showing a configuration of an interpolating part according to an embodiment of the present invention.

Next, the interpolating part 23 is described in detail. FIG. 11 is a schematic diagram showing a configuration of the interpolating part 23 according to an embodiment of the present invention.

The interpolating part 23 shown in FIG. 11 includes multiplication circuits 81-83, adder circuits 85-89, subtraction circuits 90, 91, a selection circuit 92, a NOR circuit 93, and a selection signal 94.

The multiplication circuit 81 obtains a 12 bit value by multiplying $2n_s$ (obtained by multiplying input value $n_s$ two times by adding 0 to the lowest first bit (1 bit shift to the left)) with input value $P_0$, round downs the lower four bits of the 12 bit value, and outputs the upper eight bits of the 12 bit value. The rounding out of the lower four bits corresponds to the division "/$d_g$" in the above-described formula (4).

The multiplication circuit 86 inverts the output $(n_L+n_s)$ of the adder circuit 85, adds 1 to the inverted output, and outputs $d_g-n_L-n_s$. It is noted that replacing the process of the adder circuit 86 with a mere inversion of $(n_L+n_s)$ is not permitted since it exhibits significant error and results to degradation of image quality. Furthermore, each of the subtraction circuits 90, 91 outputs $n_L-n_m$ and $n_m-n_s$, respectively.

Then, the output values are multiplied with each input value $P_s$, $P_m$, $P_L$ at the multiplication circuits 82-84, the lower four bits of the multiplied values are rounded down, and the remaining upper eight bits are selected. Then, the selected values are added by the adder circuits 87-89. Thereby, the output of the above-described formula (4) is obtained.

However, the selection signal 94 is composed of the highest bit signals of the NOR circuit 93 and the $n_s$ so that the output value $P=P_0$ when the input value $n_s$ is $n_s=d_g/2$ and the output value P is P=Ps when the input value $n_L$ is $n_L=0$.

Second Embodiment

Color Conversion Apparatus

The address generating part 21 according to the first embodiment of the present invention may be implemented with combination of logic processes instead of using the above-described address table. More specifically, instead of using the address table, an output replacing part may be provided after the body-center value generating part for replacing output values, to thereby realize a color conversion apparatus 20 having a simple configuration.

In the following, a color conversion apparatus 20 according to the second embodiment of the present invention is described.

Figure 12:
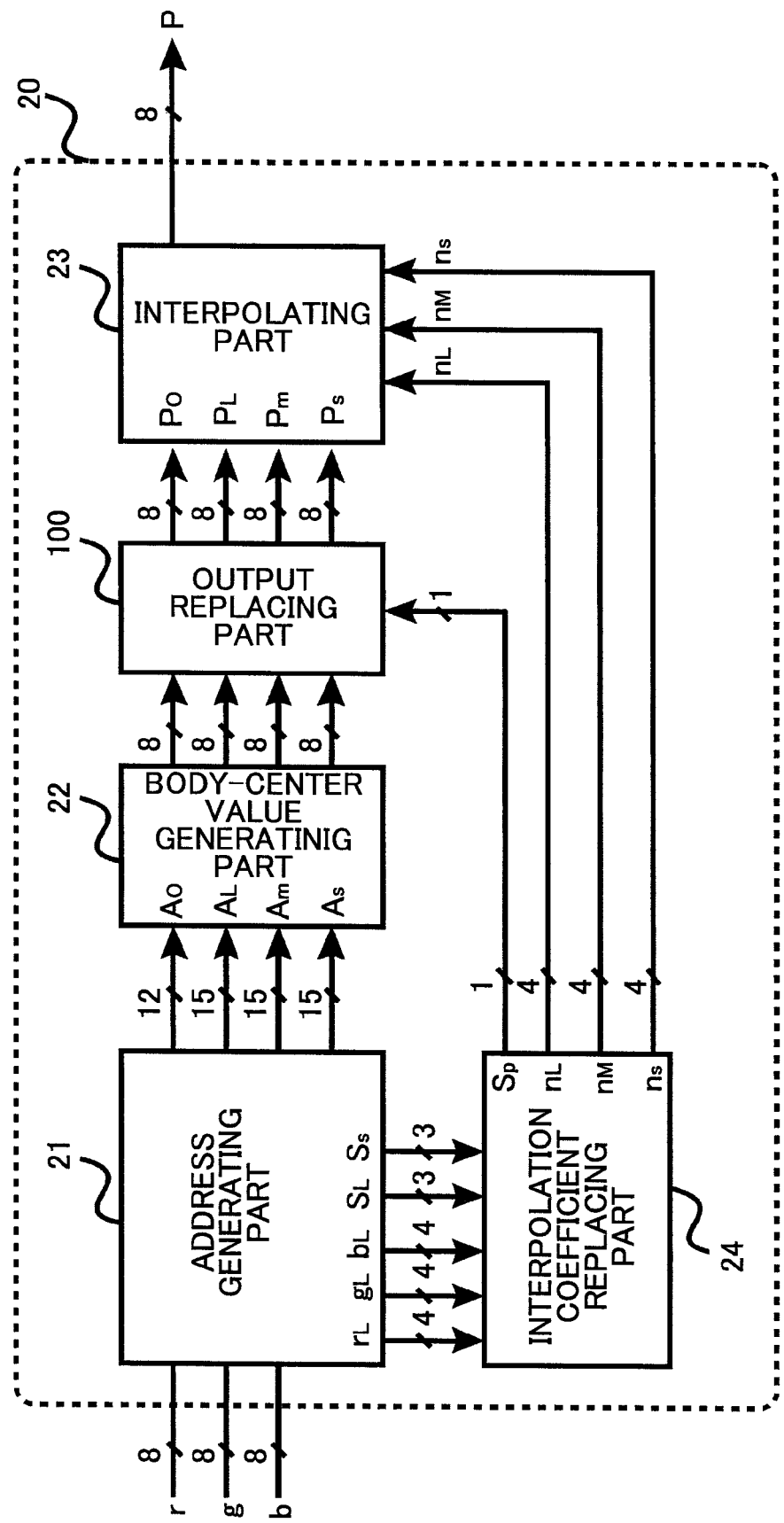
FIG. 12 is a schematic diagram showing a color conversion apparatus according to a second embodiment of the present invention.
Figure 13:
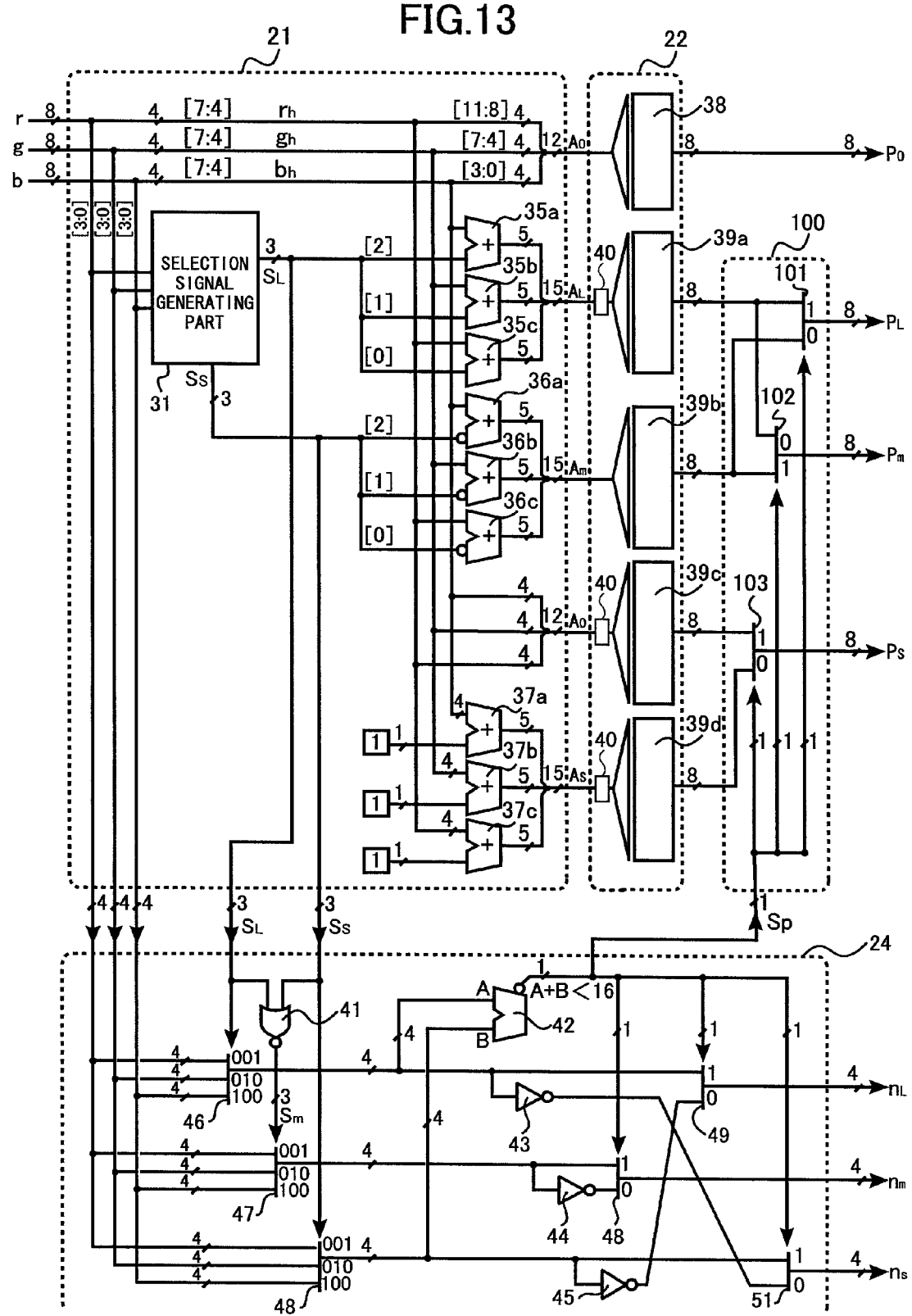
FIG. 13 is a schematic diagram showing an address generating part, a body-center value generating part, and an interpolation coefficient replacing part included in a color conversion apparatus according to a second embodiment of the present invention.

FIG. 12 is a schematic diagram showing the color conversion apparatus 20 according to the second embodiment of the present invention. It is noted that, in the second embodiment of the present invention, like components are denoted by like reference numerals as of the first embodiment of the present invention and are not further explained. FIG. 13 is a schematic diagram showing the address generating part 21, the body-center value generating part 22, and the interpolation coefficient replacing part 24 included in the color conversion apparatus 20 according to the second embodiment of the present invention.

As shown in FIG. 12, instead of an address table, an output replacing part 100 is provided after the body-center value generating part 22, to thereby realize a color conversion apparatus having a simple configuration.

In other words, instead of the address table 32 shown in FIG. 7, the maximum (largest) selection value $s_L$ of the selection signal generating part 31 is input to the adder circuits 35a, 35b, and 35c. Likewise, instead of the address table 33, the inverted value of the minimum (smallest) selection signal $s_s$ is input to the adder circuits 36a, 36b, and 36c. Furthermore, instead of the address table 34, a constant 1 is input to the adder circuits 37a, 37b, and 37c.

In comparison with FIG. 7, FIG. 13 appears to have a color conversion table 39d added to the body-center value generating part 22. This color conversion table 39d is the same as the color conversion tables 39a, 39b, and 39c, and the body-center value generating part 22 of FIG. 13 is substantially the same as that of FIG. 7. Furthermore, the output replacing part 100 of FIG. 13 includes selection circuits 101 through 103.

The output of the color conversion table 39a and the output of the color conversion table 39b are switched by the selection circuits 101 and 102 according to the output value $s_P$ of the interpolation coefficient replacing part 24. This is a process utilizing the relation where the Pm value and the $P_L$ value corresponding to the same ref value (as shown in FIG. 3) are switched by the value of $s_P$.

Thereby, an output of $P_L$ is obtained from the selection circuit 101, and an output of Pm is obtained from the selection circuit 102. Likewise, the output of the color conversion table 39c and the output of the color conversion table 39d are selected by the selection circuits 103 according to the output value $s_P$ of the interpolation coefficient replacing part 24. Thereby, an output of $P_S$ is obtained from the selection circuit 103.

With the above-described configuration according to the first embodiment of the present invention, the vertices of the cubic lattice block 2 selected by the address tables 32, 33, 34 can be adaptively changed with ease. The configuration also has an advantage of being compatible to different interpolation methods.

Meanwhile, with the second configuration according to the second embodiment of the present invention, only the selection circuits 101-103 of the output replacing part 100 are needed as an alternative of the address tables 32-34 shown in FIG. 7. This configuration can be easily implemented at a low cost while realizing substantially the same processes as those of the configuration of the first embodiment. However, in a case of prioritizing the simultaneity of processes by using the color conversion tables 39a, 39b, 39c, 39d as a single table and copying the color conversion tables 39a, 39b, 39c, 39d to an actual memory rather than using them at different timings, the configuration shown in FIG. 7 has an advantage of being capable of reducing more workload in the memory area compared to the configuration shown in FIG. 13.

Alternatively, although the output replacing part 100 is provided after the body-center value generating part 22 in the configuration shown in FIG. 13, the output replacing part 100 may be provided between the address generating part 21 and the body-center generating part 22, to thereby easily realize an equivalent process as that described above. In this case, although the bit length processed by each of the selection circuits in the body-center generating part 22 is nearly doubled, the body-center value generating part 22 can be configured the same as the body-center value generating part shown in FIG. 7. Therefore, in a case of copying the color conversion tables 39a, 39b, 39c, 39d to the actual memory for prioritizing the simultaneity of processes, the workload in the memory area can be reduced in the same manner as the configuration shown in FIG. 7.

<Comparison of Advantages with Respect to Related Art Example>

Next, advantages attained with the present invention are described in comparison with a related art example. It is to be noted that, although a two-dimensional grid is used in the following description, other multidimensional (e.g., three-dimensional) grids may also be used.

Figure 14:
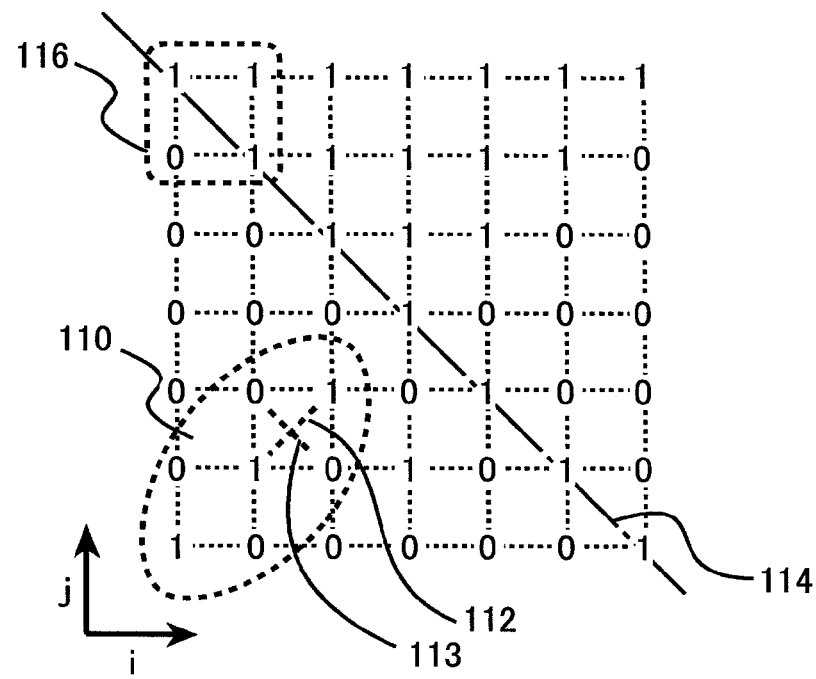
FIG. 14 is a schematic diagram showing an exemplary case where (0, 1) is assigned as output values on a 7×7 lattice including both end points.

First, a phenomenon, which occurs when an interpolation method of a related art example is used, is described. FIG. 14 shows an exemplary case where (0, 1) is assigned as the output values on a 7×7 lattice including both end points. In the example shown in FIG. 14, each square lattice block corresponds to that of trilinear interpolation (eight point interpolation) in a three-dimensional grid.

Figure 15:
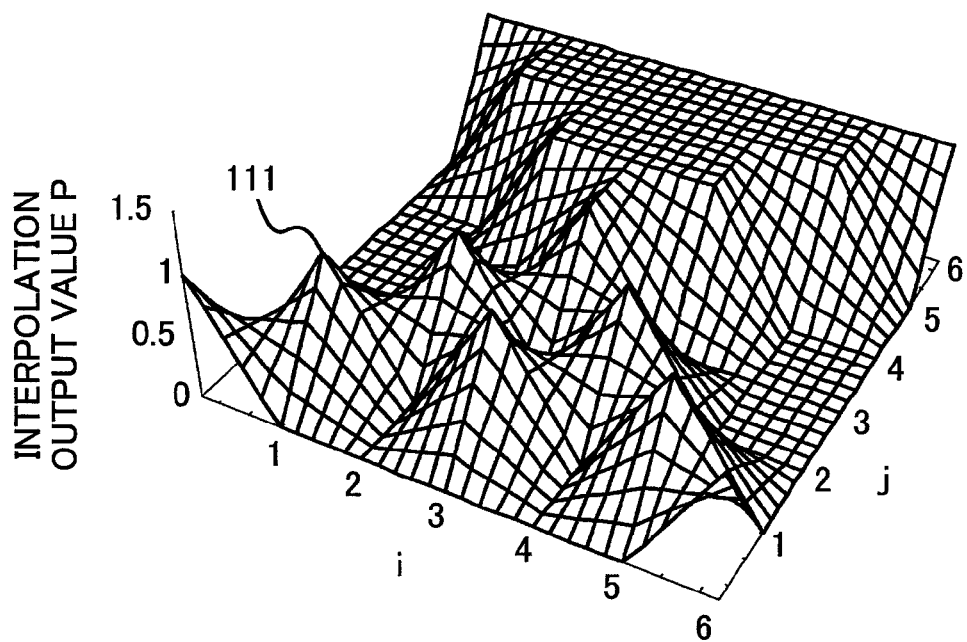
FIG. 15 is a graph showing an example of results of bilinear interpolation performed on output values shown in FIG. 14.

FIG. 15 shows an example of results of bilinear interpolation performed on the output values shown in FIG. 14. In FIG. 15, the horizontal axes correspond to vectors i and j of FIG. 14, and the vertical axis represent output values resulting from the interpolation (interpolation output value P). Output values having large wave-shaped ripples 111 can be seen particularly in an area corresponding to block 110 of FIG. 14. This is due to the significant difference in the average slant of output values situated on a diagonal line 112 and those situated on its opposite diagonal line 113 of a given block.

Figure 16:
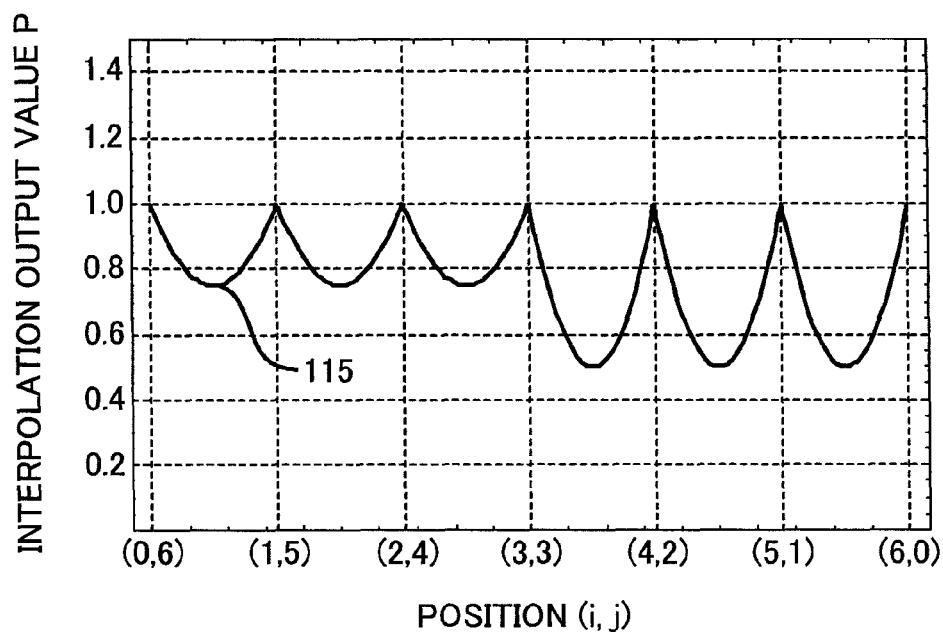
FIG. 16 is a graph showing an example of a cross-section of the example shown in FIG. 15 along the diagonal line shown in FIG. 14.

FIG. 16 is a graph showing an example of the cross-section of the example shown in FIG. 15 along the diagonal line shown in FIG. 14. As shown in FIG. 16, a valley 115 of a ripple indicates the average value of the vertices of a lattice block 116 shown in FIG. 14.

Figure 17:
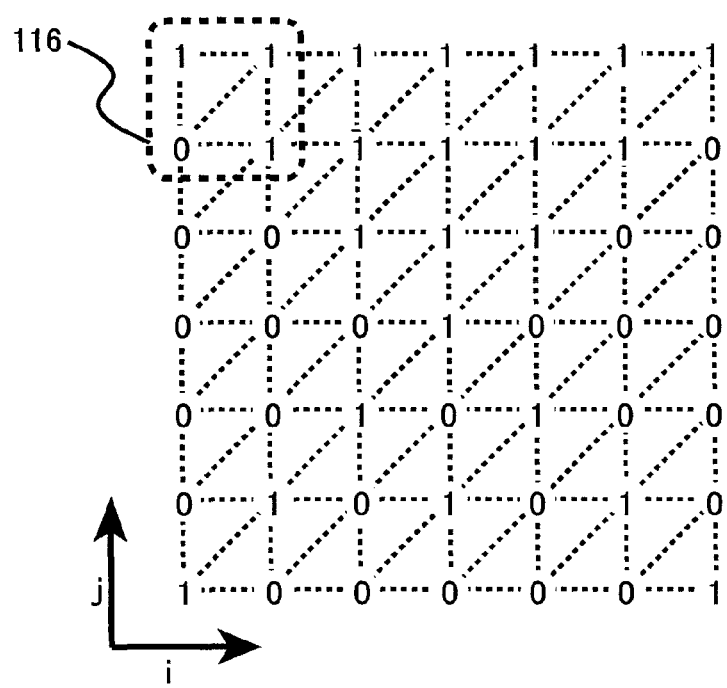
FIG. 17 is a schematic diagram showing an exemplary case where lattice blocks are divided in a direction along a main diagonal line of each lattice block.

Next, a phenomenon, which occurs when an interpolation method according to an embodiment of the present invention is used, is described. FIG. 17 shows an exemplary case where lattice blocks are divided in a direction along a main diagonal line of each lattice block. In the same manner as FIG. 14, FIG. 17 also shows an exemplary case where (0, 1) is assigned as the output values on a 7×7 lattice including both end points.

Although FIG. 17 shows the lattice block 116 being divided along the main diagonal line direction (straight direction of i=j), the lattice block 116 corresponds to a three-dimensional lattice block being divided into six tetrahedron blocks around a main diagonal line such as the cubic lattice block shown in Patent Document 3.

Figure 18:
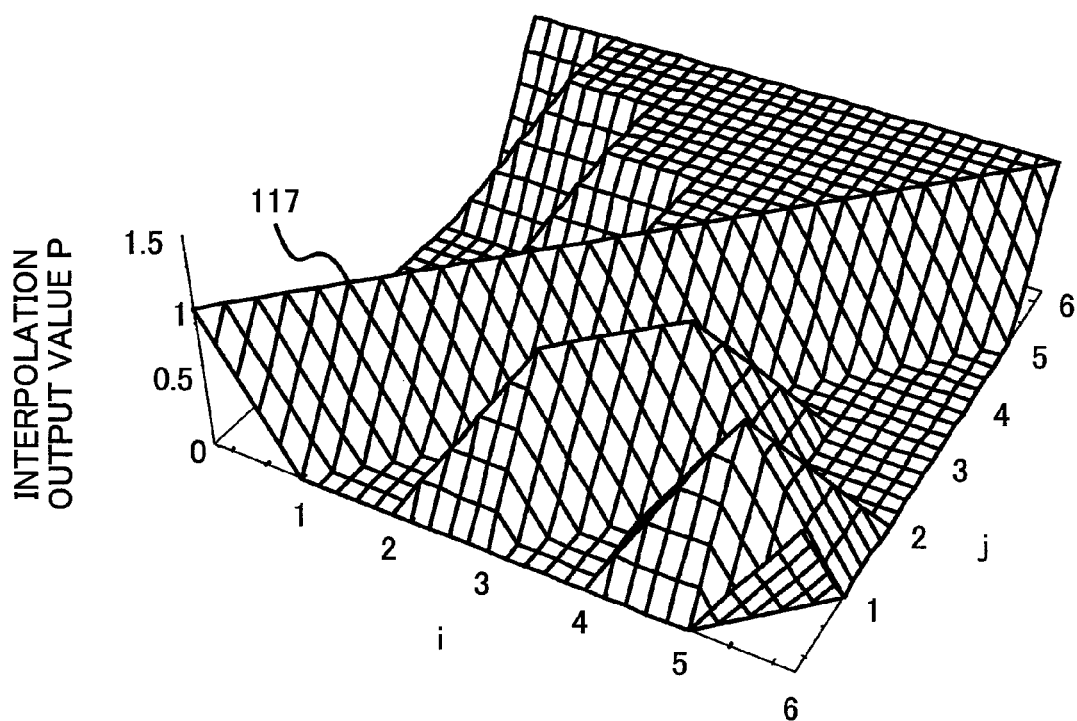
FIG. 18 is a graph showing an exemplary case where linear interpolation is performed on blocks divided into triangles.
Figure 19:
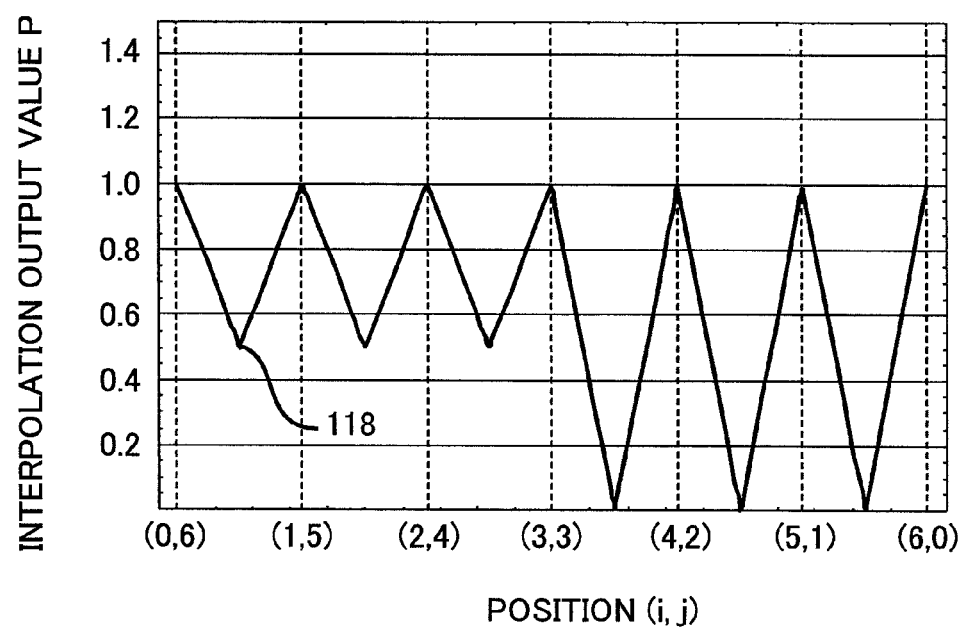
FIG. 19 is a graph showing a cross-section at i+j=7 of FIG. 18.

FIG. 18 shows an exemplary case where linear interpolation is performed on blocks divided into triangles. FIG. 19 shows a graph of a cross-section at i+j=7 of FIG. 18. In this case, ripples can be prevented on a ridge line 117 in the direction of a main diagonal line. However, this causes a side-effect of multiplying the ripples in a direction intersecting the main diagonal line as shown in the cross section of i+j=7 of FIG. 18. Although this significant anisotropy of ripples may be advantageous with respect to a distinct direction such as the grey axis (where linearity is prioritized), this leads to degradation of image quality with respect to other directions. In FIG. 19, a valley 118 of the ripple is the average of two vertices of the lattice block 116 with respect to the direction of a diagonal line opposite of the main diagonal line (i+j=7).

Figure 20:
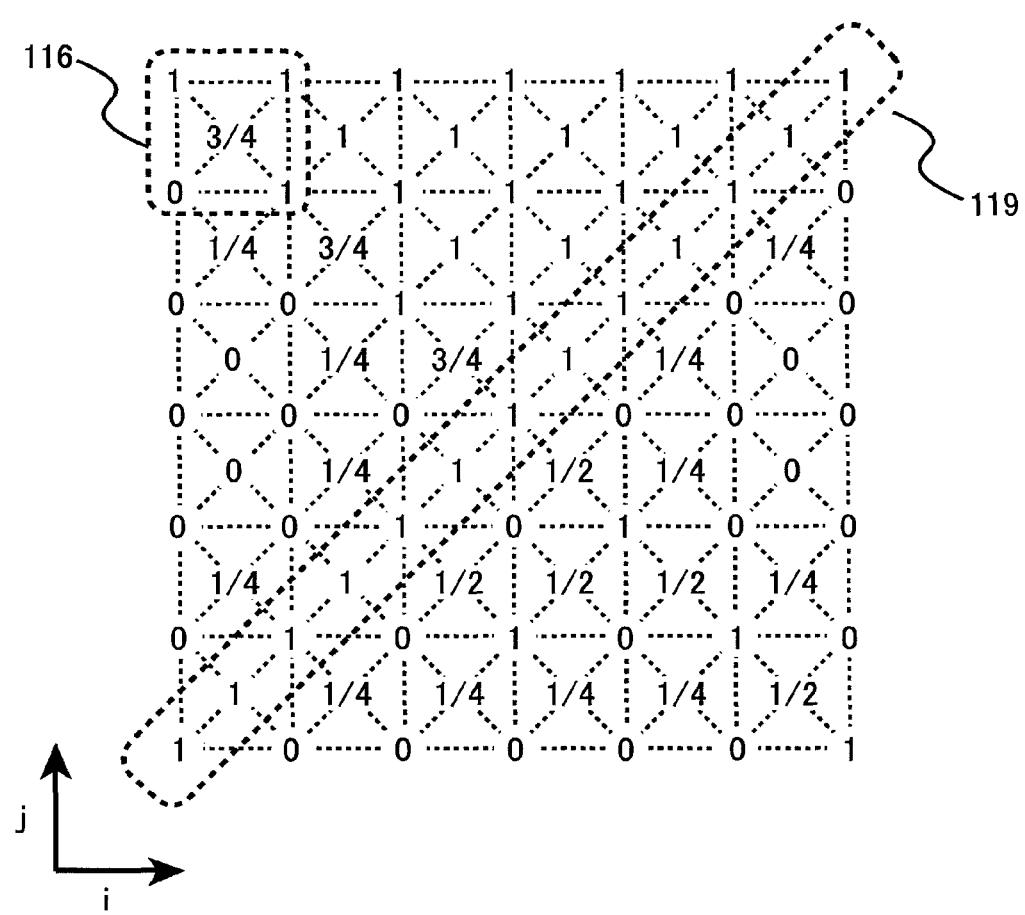
FIG. 20 is a schematic diagram showing a case where a color conversion method according to an embodiment of the present invention is applied to two-dimensional space.

Next, a case of applying the color conversion method to a two-dimensional lattice grid according to an embodiment of the present invention is described. In FIG. 20, the divided lattice blocks of FIG. 17 are further divided in the i+j=7 direction in which each divided lattice block is added with face-center data. With respect to the lattice blocks situated on a main diagonal line 119, the output value corresponding to the added face-center data is the average of two vertices of each of the lattice blocks situated on the same main diagonal line. With respect to the other remaining lattice blocks (such as the lattice block 116), the output value corresponding to the added face-data is the average of four vertices of each lattice block.

Figure 21:
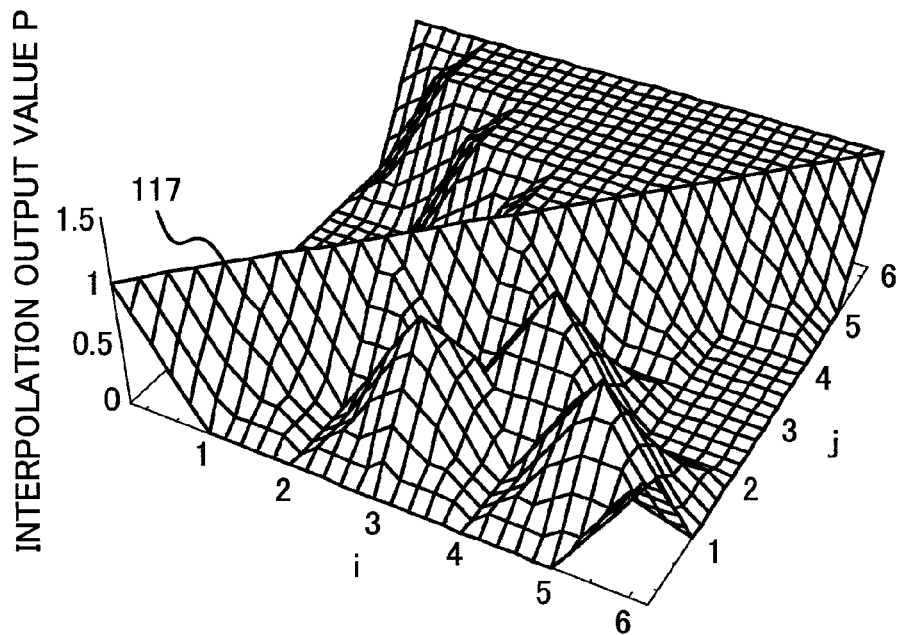
FIG. 21 is a graph showing an exemplary case of applying an interpolation method corresponding to an formula according to an embodiment of the present invention.
Figure 22:
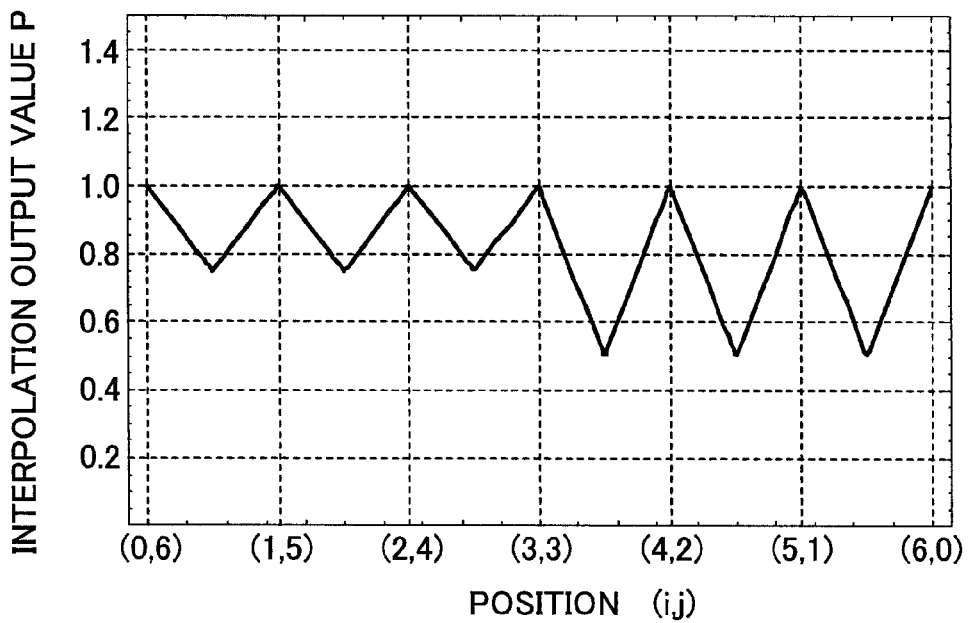
FIG. 22 is a graph showing a cross-section of FIG. 21 taken along the same diagonal line as the diagonal line of FIG. 14.

FIG. 21 shows an exemplary case of applying the interpolation method corresponding to the above-described Formula 4. FIG. 22 shows a graph of a cross-section of FIG. 21 taken along the same diagonal line as the diagonal line 114 of FIG. 14. As shown in FIG. 21, the ripples along the ridge line 117 on the main diagonal line are eliminated in the same manner as FIG. 18 while restraining the ripples (cross-section of FIG. 22) in the direction perpendicularly intersecting the main diagonal line to substantially the same level as the ripples shown in FIG. 16.

The fact of the ripples of FIG. 22 being substantially the same level as the ripples of FIG. 16 shows that the method of evenly obtaining the averages of all four vertices of a square lattice block with respect to the face-center is basically the same as the bilinear interpolation method from the aspect of eliminating ripples.

Hence, in a case of using the color conversion apparatus of the present invention with respect to a three-dimensional input, ripples can be prevented from being generated in input values (r, g, b) in the direction of the primary six color hues of RGBCMY (satisfying any of the relationships of r=g, r=b, g=b) and in the direction of the grey axis (satisfying the relationship of r=g=b). At the same time, ripples in directions other than the aforementioned directions can also be prevented.

With the embodiment of the color conversion apparatus 20 having above-described configuration, differences of reproduced colors caused by characteristic differences among different devices can be precisely corrected.

Second Embodiment

Execution Program

Although the above-described color conversion apparatus 20 can perform the color conversion method of the present invention by using a device(s) dedicated for performing the color conversion method, the color conversion method may alternatively be performed by a program (execution program) causing a computer to execute the processes of the parts/components of the color conversion apparatus 20. For example, the color conversion method according to the above-described embodiment of the present invention may be realized by installing the program in a general purpose personal computer, a server or the like.

<Hardware Configuration>

Figure 23:
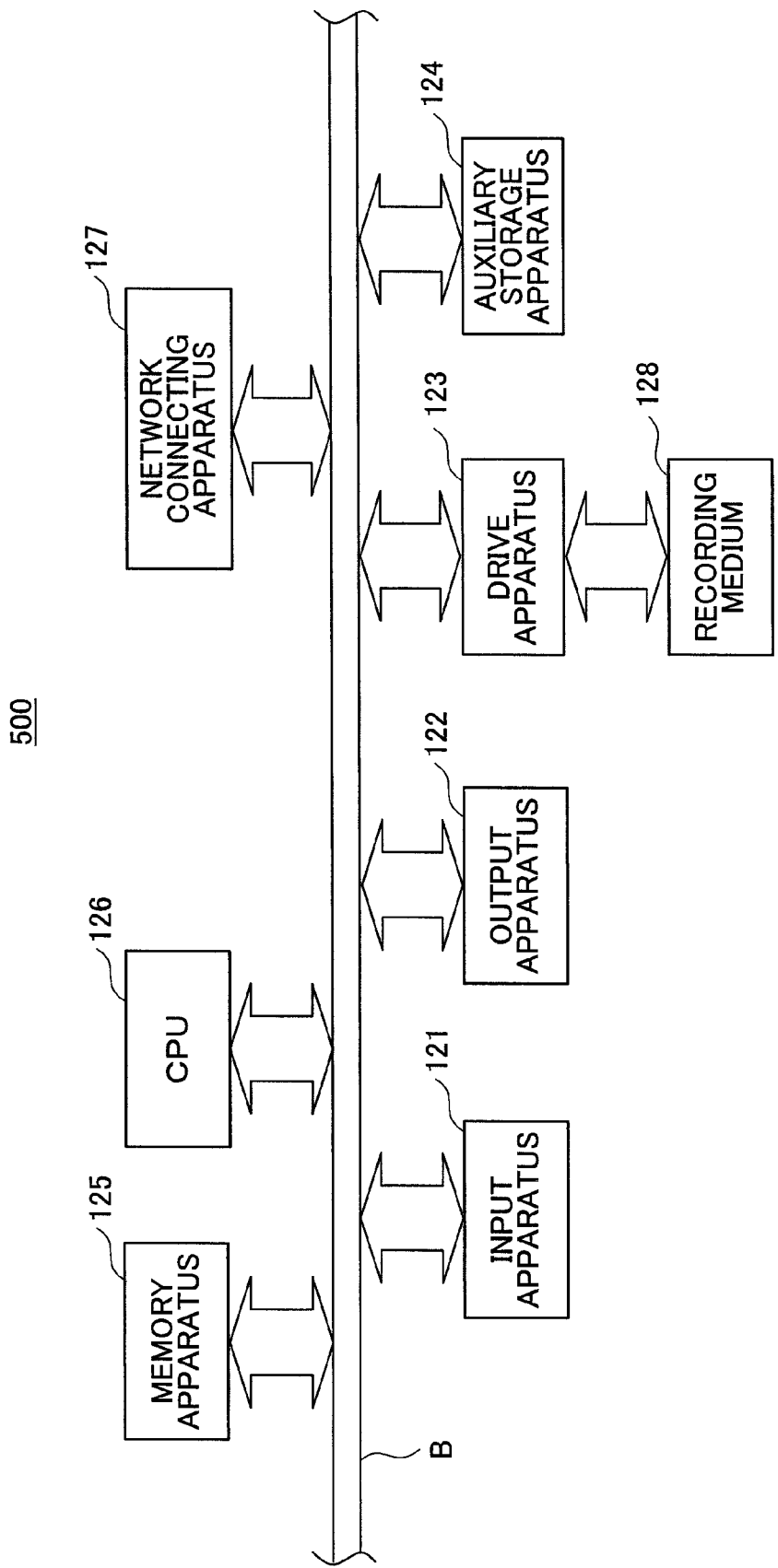
FIG. 23 is a schematic diagram showing a hardware configuration of a computer for executing a color conversion process according to an embodiment of the present invention.

Next, a hardware configuration of a computer 500 for executing a color conversion process (color conversion method) according to an embodiment of the present invention is described. FIG. 23 is a schematic diagram showing a hardware configuration of the computer 500 for executing a color conversion process according to an embodiment of the present invention.

As shown in FIG. 23, the computer 500 includes an input apparatus 121, an output apparatus 122, a drive apparatus 123, an auxiliary storage apparatus 124, a memory apparatus 125, a CPU (Central Processing Unit) 126 used for performing various controls, and a network connecting apparatus 127 which are connected by a system bus B.

The input apparatus 121 includes, for example, a keyboard, a pointing device (e.g., mouse), or an audio input device operated by a user. The input apparatus 121 is configured to input execution commands of a program from the user, various control signals, and audio signals. The output apparatus 122 includes, for example, a speaker and a display for displaying various windows and data required for operating the computer 500. The output apparatus 122 is configured to display or perform audio outputs of a process or a result executed by a control program in the CPU 126.

In this embodiment of the present invention, the program (execution program used for executing the above-described color conversion method), which is to be installed in the computer 500, is provided in a recording medium 128 (e.g., CD-ROM, DVD). The recording medium 128 to which the program is recorded can be loaded to a drive apparatus 123. Then, the program recorded in the recording medium can be installed in the auxiliary storage apparatus 124 via the drive apparatus 123.

The drive apparatus 123 is configured to record the program to the recording medium 128. This enables other computers to easily install the program and execute the above-described color conversion method by using the recording medium 128.

The auxiliary storage apparatus 124 includes, for example, a storage part (e.g., hard disk) for storing the execution program of the present invention and other control programs installed in the computer 500 for performing input/outputs according to necessity.

The memory apparatus 125 is configured to store the execution program read out from the auxiliary storage apparatus 124 by the CPU 126. The memory apparatus 125 includes, for example, ROM (Read Only Memory) and RAM (Random Access Memory).

The CPU 126 is configured to perform various processes of the above-described color conversion method by performing overall controls on the computer 500 (e.g., operations (calculations) and input/output of data) based on the control program (e.g., OS (Operating System) and the execution program read out from the auxiliary storage apparatus 124 and stored in the memory apparatus 125. Furthermore, necessary data required during execution of the program may be obtained from the auxiliary storage apparatus 124 or stored, for example, in the memory apparatus 125.

The network connecting apparatus 127 is connected to, for example, a communication network such as a telephone line or a LAN (Local Area Network). Thereby, the execution program can be obtained from other terminals connected to the communication network or provided to other terminals connected to the communication network. Furthermore, the results obtained by the execution program may also be provided to other terminals connected to the communication network.

Since the above-described embodiment of the hardware configuration requires no additional device dedicated for the color conversion method of the present invention, the color conversion method can be performed at a low cost. Furthermore, by installing the above-described execution program to a computer or a recording medium, the color conversion method can be easily performed. Next, an operation using the execution program according to an embodiment of the present invention is described by using a flowchart.

<Color Conversion Process>

Figure 24:
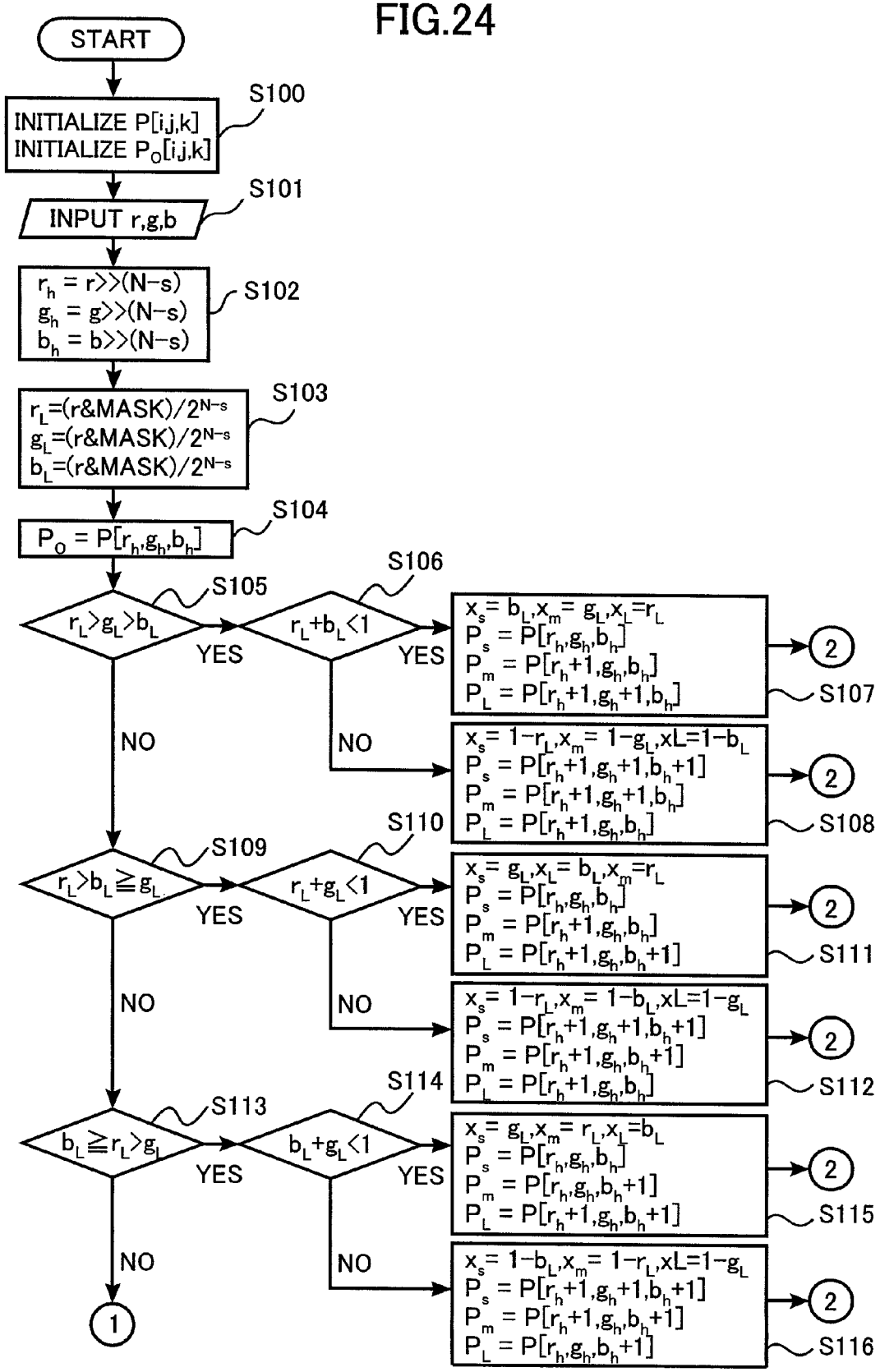
FIGS. 24-26 are flowcharts showing
Figure 25:
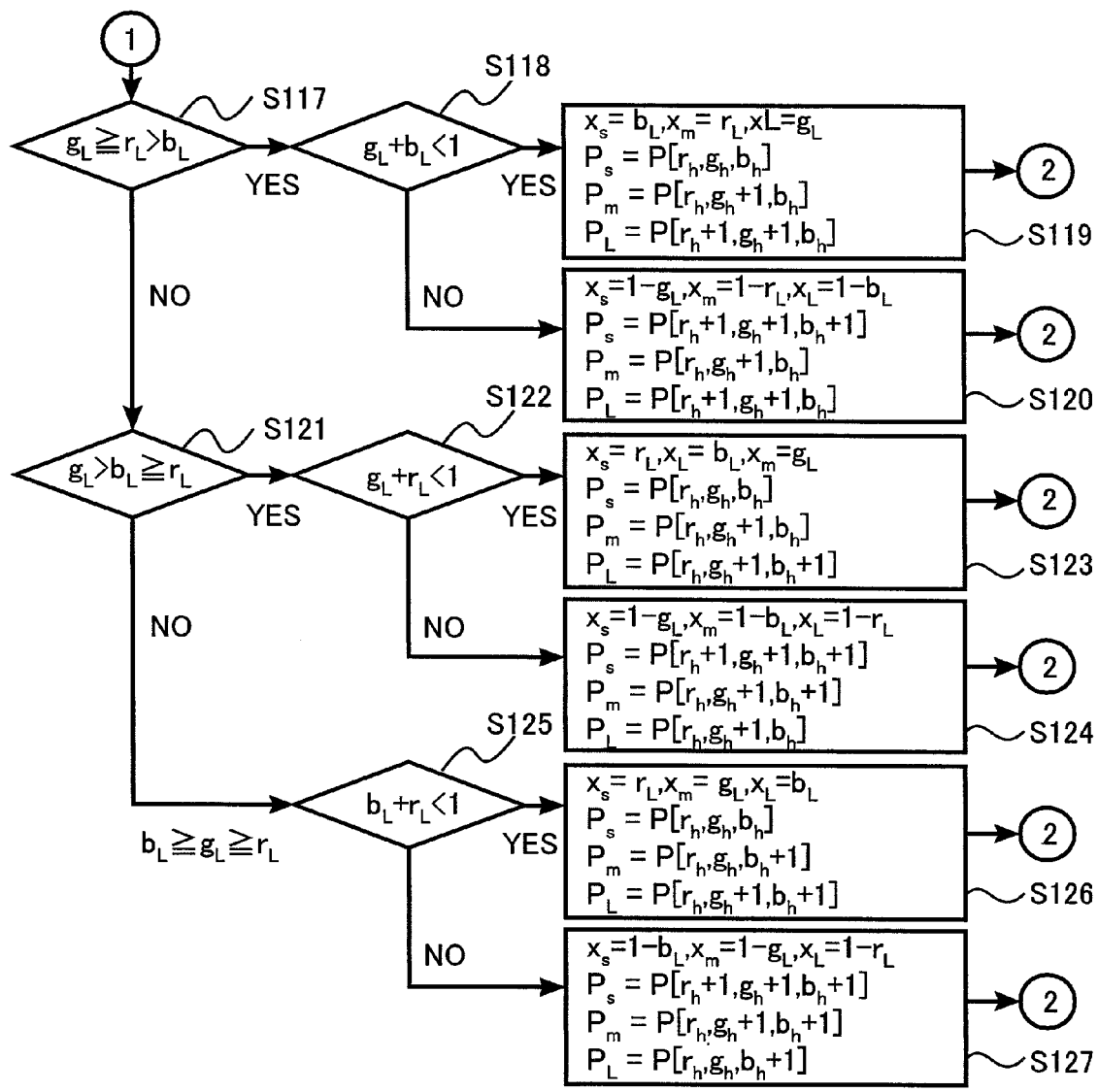
Figure 26:
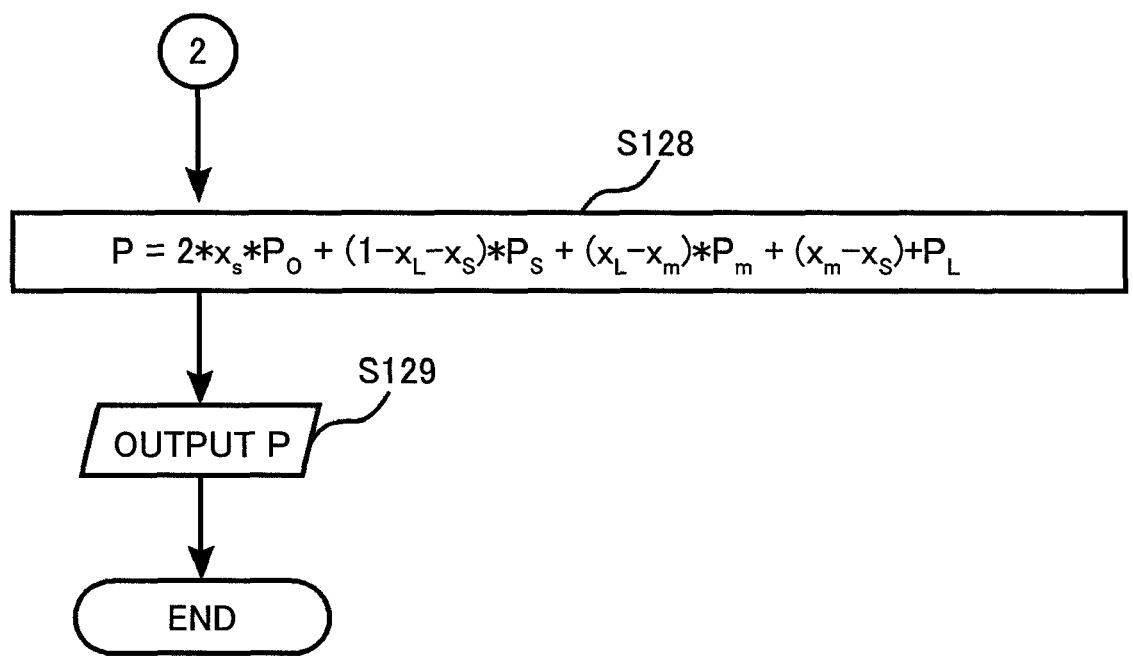

FIGS. 24 through 26 show flowcharts of an exemplary color conversion operation according to an embodiment of the present invention. It is to be noted that, although the color conversion operation is illustrated with separate drawings (FIGS. 24-26), the color conversion operation is a continuous operation. Furthermore, ①shown in FIG. 24 corresponds to ①shown in FIG. 25, and ②shown in FIGS. 24 and 25 corresponds to ②shown in FIG. 26.

Although above-described embodiments of the present invention explains a case of dividing r, g, b input values of eight bits into upper four bits and lower four bits and using the upper four bits for generating the base address and the lower four bits for generating an interpolation coefficient, other bit lengths may be used. Therefore, in the following example, the bit length of the input signal is assumed as N bits ($N \geq 8$) wherein the upper s bits are used for generating a base address and the lower (N−s) bits are used for generating the interpolation coefficient.

Since the input channels are divided into $D < 2^s$ parts, the dimension of multidimensional lookup tables P, $P_0$ are (D+1)×(D+1)×(D+1). The components in the lookup table are indicated as P [i, j, k] with respect to i, j, k=0, 1, . . . , D−1.

In the following example, component P[i, j, k] is considered as a scalar. The same process can be achieved whether it is regarded to perform a process in correspondence with the number of output channels or to perform vector calculation where component P[i, j, k] is regarded as vectors assuming that the number of output channels represents dimension.

In FIG. 24, a lookup table P and a lookup table $P_0$ are initialized (S100). P [i, j, k] is a table for defining conversion. The P [i, j, k] is initialized by using output values to be associated to input values (r, g, b)=(i, j, k). The lookup table $P_0$ is an array of body-center data to be added to each cubic lattice block for assisting interpolation of P. The lookup table $P_0$ is initialized as follows.

$$P_0[i,i,i]=(P[i,i,i]+P[i+1,i+1,i+1])/2$$

$$P_0[i,i,j]=(P[i,i,i]+P[i,i,j+1]+P[i+1,i+1,j]+P[i+1,i+1,j+1])/4$$

$$P_0[i,j,i]=(P[i,j,i]+P[i,j+1,i]+P[i+1,j,i+1]+P[i+1,j+1,i+1])/4$$

$$P_0[j,i,i]=(P[j,i,i]+P[j+1,i,i]+P[j,i1,i+1]+P[j+1,i+1,i+1])/4$$

$$P_0[i,j,k]=(P[i,j,k]+P[i,j,k+1]+P[i,j+1,k]\\+[i,j+1,k+1]+P[i+1,j,k]+P[i+1,j,k+1]+\\P[i+1,j+1,k]+P[i+1,j+1,k+1])/8$$

However, i, j, and k are different integers ranging from 0 to D.

It is to be noted that, although the body-center value generating part is realized by the above-described lookup table $P_0$, an algorithm for initializing the lookup table $P_0$ may be directly built-in as a logic circuit.

After the initialization of Step S100, (r, g, b) of N bits are input (Step S101). Then, each of r, g, and b is shifted (N−s) bits to the right, to thereby extract the upper s bits of r, g, b ($r_h=r>>(N-s)$, $g_h=g>>(N-s)$, $b_h=b>>(N-s)$) (Step S102).

Then, the lower (N−s) bits of r, g, b obtained by logical multiplication with a constant $MASK=2^{(N-s)}-1$ is extracted, and each of the extracted bits is divided by $2^{(N-s)}$ as a floating point. Thereby, normalized floating points ($r_L=(r\&MASK)/2^{(N-s)}$, $g_L=(g\&MASK)/2^{(N-s)}$, $b_L=(b\&MASK)/2^{(N-s)}$) in a range of 0-1 are obtained (Step S103). In Step S105 and steps thereafter, allocation (assignment) is performed according to the size relationship between $r_L$, $g_L$, $b_L$ based on the above-described table shown in FIG. 3. First, in Step S105, it is determined whether a relationship of $r_L > g_L > b_L$ is satisfied. When $r_L > g_L > b_L$ is satisfied (Yes in Step S105), it is determined whether a relationship of $r_L + b_L < 1$ is satisfied (Step S106). When $r_L + b_L < 1$ is satisfied (Yes in Step S106), the interpolation coefficients $x_s$, $x_m$, $x_L$ and the vertices $P_s$, $P_m$, $P_L$ of a tetrahedron are assigned with values shown in Step S107, and the operation continues to ② of FIG. 26. In the process of Step S107, $x_s=b_L$, $x_m=g_L$, $x_L=r_L$, $P_s=P[r_h, g_h, b_h]$, $P_m=P[r_h+1, g_h, b_h]$, $P_L=P[r_h+1, g_h+1, b_h]$.

Furthermore, in the process of Step S106, when $r_L+b_L<1$ is not satisfied (No in Step S106), the interpolation coefficients $x_s$, $x_m$, $x_L$ and the vertices $P_s$, $P_m$, $P_L$ of a tetrahedron are assigned with values shown in Step S108, and the operation continues to ② of FIG. 26. In the process of Step S108, $x_s=1-r_L$, $x_m=1-g_L$, $x_L=1-b_L$, $P_s=P[r_h+1, g_h+1, b_h+1]$, $P_m=P[r_h+1, g_h+1, b_h]$, $P_L=P[r_h+1, g_h, b_h]$.

Furthermore, in the process of Step S105, when $r_L > g_L > b_L$ is not satisfied (No in Step S105), it is determined whether a relationship of $r_L > b_L \geq g_L$ is satisfied (Step S109). When $r_L > b_L \geq g_L$ is satisfied (Yes in Step S109), it is further determined whether a relationship of $r_L+g_L<1$ (Step S110). When $r_L+g_L<1$ is satisfied (Yes in Step S110), the interpolation coefficients $x_s$, $x_m$, $x_L$ and the vertices $P_s$, $P_m$, $P_L$ of a tetrahedron are assigned with values shown in Step S111, and the operation continues to ② of FIG. 26. In the process of Step S111, $x_s=g_L$, $x_L=b_L$, $x_m=r_L$, $P_s=P[r_h, g_h, b_h]$, $P_m=P[r_h, g_h, b_h]$, $P_L=P[r_h+1, g_h, b_h+1]$.

Furthermore, in the process of Step S110, when $r_L+g_L<1$ is not satisfied (No in Step S110), the interpolation coefficients $x_s$, $x_m$, $x_L$ and the vertices $P_s$, $P_m$, $P_L$ of a tetrahedron are assigned with values shown in Step S112, and the operation continues to ② of FIG. 26. In the process of Step S112, $x_s=1-r_L$, $x_m=1-b_L$, $x_L=1-g_L$, $P_s=P[r_h+1, g_h+1, b_h+1]$, $P_m=P[r_h+1, g_h, b_h+1]$, $P_L=P[r_h+1, g_h, b_h]$.

Furthermore, when $r_L>b_L\geq g_L$ is not satisfied (No in Step S109), it is further determined whether a relationship of $b_L\geq r_L>g_L$ (Step S113). When $b_L\geq r_L>g_L$ is satisfied (Yes in Step S113), it is further determined whether $b_L+g_L<1$ (Step S114). When $b_L+g_L<1$ is satisfied (Yes in Step S114), the interpolation coefficients $x_s$, $x_m$, $x_L$ and the vertices $P_s$, $P_m$, $P_L$ of a tetrahedron are assigned with values shown in Step S115, and the operation continues to ②of FIG. 26. In the process of Step S115, $x_s=g_L$, $x_m=r_L$, $x_L=b_L$, $P_s=P[r_h, g_h, b_h]$, $P_m=P[r_h, g_h, b_h+1]$, $P_L=P[r_h+1, g_h, b_h+1]$.

Furthermore, when $B_L+g_L<1$ is not satisfied (No in Step S114), the interpolation coefficients $x_s$, $x_m$, $x_L$ and the vertices $P_s$, $P_m$, $P_L$ of a tetrahedron are assigned with values shown in Step S116, and the operation continues to ②of FIG. 26. In the process of Step S116, $x_s=1-b_L$, $x_m=1-r_L$, $x_L=1-g_L$, $P_s=P[r_h+1, g_h+1, b_h+1]$, $P_m=P[r_h+1, g_h, b_h+1]$, $P_L=P[r_h, g_h, b_h+1]$.

Furthermore, when $b_L\geq r_L>g_L$ is not satisfied (No in Step S113), it is determined whether a relationship of $g_L\geq r_L>b_L$ is satisfied (Step S117). When $g_L\geq r_L>b_L$ is satisfied (Yes in Step S117), it is further determined whether a relationship of $g_L+b_L<1$ is satisfied (Step S118). When $g_L+b_L<1$ is satisfied (Yes in Step S118), the interpolation coefficients $x_s$, $x_m$, $x_L$ and the vertices $P_s$, $P_m$, $P_L$ of a tetrahedron are assigned with values shown in Step S119, and the operation continues to ②of FIG. 26. In the process of Step S119, $x_s=b_L$, $x_m=r_L$, $x_L=g_L$, $P_s=P[r_h, g_h, b_h]$, $P_m=P[r_h, g_h+1, b_h]$, $P_L=P[r_h+1, g_h+1, b_h]$.

Furthermore, when $g_L+b_L<1$ is not satisfied (No in Step S118), the interpolation coefficients $x_s$, $x_m$, $x_L$ and the vertices $P_s$, $P_m$, $P_L$ of a tetrahedron are assigned with values shown in Step S120, and the operation continues to ②of FIG. 26. In the process of Step S120, $x_s=1-g_L$, $x_m=1-r_L$, $x_L=1-b_L$, $P_s=P[r_h, g_h, b_h]$, $P_m=P[r_h, g_h+1, b_h]$, $P_L=P[r_h+1, g_h+1, b_h]$.

Furthermore, when $g_L\geq r_L>b_L$ is not satisfied (No in Step S117), it is further determined whether a relationship of $g_L>b_L\geq r_L$ is satisfied (Step S121). When $g_L>b_L\geq r_L$ is satisfied (Yes in Step S121), it is further determined whether a relationship of $g_L+r_L<1$ is satisfied (Step S122). When $g_L+r_L<1$ is satisfied (Yes in Step S122), the interpolation coefficients $x_s$, $x_m$, $x_L$ and the vertices $P_s$, $P_m$, $P_L$ of a tetrahedron are assigned with values shown in Step S123, and the operation continues to ②of FIG. 26. In the process of Step S123, $x_s=r_L$, $x_L=b_L$, $x_m=g_L$, $P_s=P[r_h, g_h, b_h]$, $P_m=P[r_h, g_h+1, b_h]$, $P_L=P[r_h, g_h+1, b_h+1]$.

Furthermore, when $g_L+r_L<1$ is not satisfied (No in Step S122), the interpolation coefficients $x_s$, $x_m$, $x_L$ and the vertices $P_s$, $P_m$, $P_L$ of a tetrahedron are assigned with values shown in Step S124, and the operation continues to ②of FIG. 26. In the process of Step S124, $x_s=1-g_L$, $x_m=1-b_L$, $x_L=1-r_L$, $P_s=P[r_h+1, g_h+1, b_h+1]$, $P_m=P[r_h, g_{h+1}, b_h+1]$, $P_L=P[r_h, g_h+1, b_h]$.

Since the remaining condition would $b_L\geq g_L\geq r_L$ when $g_L>b_L\geq r_L$ is not satisfied (No in Step S121), determination for such relationship is not omitted and proceeds to determining whether a relationship of $b_L+r_L<1$ is satisfied (Step S125). When $b_L+r_L<1$ is satisfied (Yes in Step S125), the interpolation coefficients $x_s$, $x_m$, $x_L$ and the vertices $P_s$, $P_m$, $P_L$ of a tetrahedron are assigned with values shown in Step S126, and the operation continues to ②of FIG. 26. In the process of Step S126, $x_s=r_L$, $x_m=g_L$, $x_L=b_L$, $P_s=P[r_h, g_h, b_h]$, $P_m=P[r_h, g_h, b_h+1]$, $P_L=P[r_h, g_h+1, b_h+1]$.

Furthermore, when $b_L+r_L<1$ is not satisfied (No in Step S125), the interpolation coefficients $x_s$, $x_m$, $x_L$ and the vertices $P_s$, $P_m$, $P_L$ of a tetrahedron are assigned with values shown in Step S127, and the operation continues to ②of FIG. 26. In the process of Step S127, $x_s=1-b_L$, $x_m=1-g_L$, $x_L=1-r_L$, $P_s=P[r_h+1, g_h+1, b_h+1]$, $P_m=P[r_h, g_h+1, b_h+1]$, $P_L=P[r_h, g_h, b_h+1]$.

The size determination in Steps S105, S109, S113, S117, and S121 correspond to the relationships indicated in the column "relationship" in the lookup table of FIG. 3, and actually correspond to the determination results of $r_L>g_L$, $r_L>b_L$, and $g_L>b_L$ indicated in the column "rel" in the lookup table of FIG. 3. Accordingly, in order to efficiently perform the above-described operation, the values of the three determination results may be collected as integers ranging from 0-7 prior to the process of Step S105 and used for the assigning process.

When the interpolation coefficients $x_s$, $x_m$, $x_L$ and the vertices $P_0$, $P_s$, $P_m$, $P_L$ of the tetrahedrons are determined by the processes shown in FIGS. 24 and 25, the interpolation process shown in FIG. 26 is performed by using the determined values, thereby an output value P is determined (Step S129).

More specifically, in the process of Step S128, $P=2*x_s*P_0+(1-x_L-x_S)*P_S+(x_L-x_m)*P_m+(x_m-x_S)*P_L$.

After the process of Step S129 is completed, the color conversion operation, according to necessity, may return to Step S101 and repeat the processes on another input value (r, g, b). Thereby, processes substantially equivalent to those of the first embodiment of the present invention can be realized by an algorithm processible with software.

Although the above-described embodiments of the present invention describe an exemplary case where RGB are the parameters of an input space, other input parameters may also be used. For example, input parameters such as complementary colors of RGB (e.g., CMY), XYZ defined by CIE or L*a*b.

In a case where L*a*b are the input parameters, regardless of the dividing method of a cubic lattice block, ripples are not generated along the grey axis since brightness can easily be assigned along the grid from the beginning. It is, however, effective for reducing ripples of hue that cross over the diagonal line of a cubic lattice block.

With the above-described embodiments of the present invention, differences of reproduced colors caused by characteristic differences among different devices can be precisely corrected. More specifically, addresses of appropriate vertices including the addresses of the vertices of a tetrahedron block are generated by an address generating part, and interpolation coefficients are rearranged by an interpolation coefficient replacing part. Thereby, a common (shared) interpolating part can be used for tetrahedron blocks oriented in different directions. This simplifies the logic of the interpolating part. Furthermore, since rearranging of vertex data can be conducted by an easily usable output replacing part, the address generating part can be simplified as well as reducing logic circuit size.

The color conversion apparatus, the color conversion method, and the color conversion program according to the above-described embodiments of the present invention can be applied to color printers, color printing presses, or pre-processing apparatuses thereof (e.g., personal computers) for precisely correcting differences of reproduced colors caused by characteristic differences among different devices.

The present invention is not limited to the specifically disclosed embodiments, and variations and modifications may be made without departing from the scope of the present invention.

The present application is based on Japanese Priority Application No. 2007-139685 filed on May 25, 2007 with the Japanese Patent Office, the entire contents of which are hereby incorporated herein by reference.

What is claimed is:

1. A color conversion apparatus for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion apparatus comprising:

a body-center value generating part for generating output values corresponding to a body-center of each cubic lattice block included in the three-dimensional input space; and an interpolating part for interpolating between the output values generated by the body-center value generating part and the LUT values;

wherein the cubic lattice block is divided into six quadrangular pyramids, wherein each of the quadrangular pyramids is divided into two tetrahedron blocks by a side parallel to a predetermined straight line and by a plane including a diagonal line of a bottom plane that intersects the side parallel to the predetermined axis;

wherein the corrected output values are determined by performing linear interpolation on output values corresponding to body-center points of each of the tetrahedron blocks and using the LUT values corresponding to three lattice points of each of the tetrahedron blocks and three correction coefficients based on a positional relationship of the input color signals inside each of the tetrahedron blocks.

2. A color conversion apparatus for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion apparatus comprising:

an interpolating part for dividing each cubic lattice block included in the three-dimensional input space into a plurality of tetrahedron blocks and associating output values to four output values interpolated with four interpolation output values P* corresponding to four vertices of one of the plural tetrahedron blocks containing a point P;

an output replacing part for replacing the four interpolation output values P* corresponding to the four vertices of one of the plural tetrahedron blocks; and an interpolation coefficient replacing part for replacing interpolation coefficients used for interpolating the four output values.

3. A color conversion apparatus for performing color conversion by using a lookup table indicative of LUT (Look-Up Table) values corresponding to lattice points of a n-dimensional input space including input color signals of n (n≧3) input channels and associating the lattice points to corrected output values by performing interpolation on the LUT values, the color conversion apparatus comprising:

a body-center value generating part for generating output values corresponding to a body-center of each n-dimensional cubic lattice block included in the n-dimensional input space; and an interpolating part for interpolating between the output values generated by the body-center value generating part and the LUT values;

wherein when $2^n$ vertices of the n-dimensional cubic lattice block have relative coordinates that are associated with binary numerals of n digits and expressed as [0 . . . 00], [0 . . . 01], [0 . . . 10], [0 . . . 11], . . . [1 . . . 11], an n unit simplex having combinations of n+1 vertices forming a route from a starting point [0 . . . 00] to an ending point [1 . . . 11] without backtracking is divided into a first n unit simplex obtained by replacing the starting point with the body-center of a corresponding cubic lattice block and a second n unit simplex obtained by replacing the ending point with the body-center of another corresponding cubic lattice block, wherein the starting point is assumed as a vertex [0 . . . 00] in which all of its components are 0 and the ending point is assumed as a vertex [1 . . . 11] in which all of its components are 1, wherein the interpolating part performs linear interpolation on the output values corresponding to the body-centers of the obtained first and second simplexes.

4. A color conversion method for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion method comprising the steps of:

a) generating output values corresponding to a body-center of each cubic lattice block included in the three-dimensional input space; and b) interpolating between the output values generated in step a) and the LUT values;

wherein the cubic lattice block is divided into six quadrangular pyramids, wherein each of the quadrangular pyramids is divided into two tetrahedron blocks by a side parallel to a predetermined straight line and by a plane including a diagonal line of a bottom plane that intersects the side parallel to the predetermined axis;

wherein the corrected output values are determined by performing linear interpolation on output values corresponding to body-center points of each of the tetrahedron blocks and using the LUT values corresponding to three lattice points of each of the tetrahedron blocks and three correction coefficients based on a positional relationship of the input color signals inside each of the tetrahedron blocks.

5. A color conversion method for performing color conversion by using a lookup table indicative of LUT (Look-Up Table) values corresponding to lattice points of a three-dimensional input space including input color signals of three input channels and associating the lattice points to corrected output values by performing interpolation on the LUT values, the color conversion method comprising the steps of:

a) dividing each cubic lattice block included in the three-dimensional input space into a plurality of tetrahedron blocks;

b) associating output values to four output values interpolated with four interpolation output values P* corresponding to four vertices of one of the plural tetrahedron blocks containing a point P;

c) replacing the four interpolation output values P* corresponding to the four vertices of one of the plural tetrahedron blocks; and d) replacing interpolation coefficients used for interpolating the four output values.

6. A color conversion method for performing color conversion by using a lookup table indicative of LUT (Look-Up Table) values corresponding to lattice points of a n-dimensional input space including input color signals of n (n≧3) input channels and associating the lattice points to corrected output values by performing interpolation on the LUT values, the color conversion method comprising the steps of:

a) generating output values corresponding to a body-center of each n-dimensional cubic lattice block included in the n-dimensional input space; and b) interpolating between the output values generated by the body-center value generating part and the LUT values;

wherein when $2^n$ vertices of the n-dimensional cubic lattice block have relative coordinates that are associated with binary numerals of n digits and expressed as [0 . . . 00], [0 . . . 01], [0 . . . 10], [0 . . . 11], . . . , [1 . . . 11], an n unit simplex having combinations of n+1 vertices forming a route from a starting point [0 . . . 00] to an ending point [1 . . . 11] without backtracking is divided into a first n unit simplex obtained by replacing the starting point with the body-center of a corresponding cubic lattice block and a second n unit simplex obtained by replacing the ending point with the body-center of another corresponding cubic lattice block, wherein the starting point is assumed as a vertex [0 . . . 00] in which all of its components are 0 and the ending point is assumed as a vertex [1 . . . 11] in which all of its components are 1, wherein the step b) includes performing linear interpolation on the output values corresponding to the body-centers of the obtained first and second simplexes.

* * * * *